United States Patent
Oswald et al.

(10) Patent No.: US 10,507,743 B2
(45) Date of Patent: Dec. 17, 2019

(54) JUVENILE VEHICLE SEAT WITH ADJUSTABLE HEADREST

(71) Applicant: Dorel Juvenile Group, Inc., Foxboro, MA (US)

(72) Inventors: Kevin C. Oswald, Columbus, IN (US); Mei-Hui Lin, Nashville, IN (US); Devin J. Coakley, Bellingham, MA (US); Ryan Hawker, Quincy, MA (US); Jason H. Johnson, Brownstown, IN (US)

(73) Assignee: Dorel Juvenile Group, Inc., Foxboro, MA (US)

( * ) Notice: Subject to any disclaimer, the term of this patent is extended or adjusted under 35 U.S.C. 154(b) by 42 days.

(21) Appl. No.: 15/893,099

(22) Filed: Feb. 9, 2018

(65) Prior Publication Data

US 2018/0222358 A1 Aug. 9, 2018

Related U.S. Application Data

(60) Provisional application No. 62/456,978, filed on Feb. 9, 2017.

(51) Int. Cl.
*B60N 2/28* (2006.01)

(52) U.S. Cl.
CPC ......... *B60N 2/2851* (2013.01); *B60N 2/2827* (2013.01); *B60N 2/2857* (2013.01); *B60N 2/2872* (2013.01)

(58) Field of Classification Search
CPC ............................ B60N 2/2851; B60N 2/2857
USPC .................................................. 297/256.11
See application file for complete search history.

(56) References Cited

U.S. PATENT DOCUMENTS

| | | | |
|---|---|---|---|
| 5,695,245 A | 12/1997 | Carlson et al. | |
| 5,746,478 A | 5/1998 | Lumley et al. | |
| 5,845,968 A * | 12/1998 | Lovie | B60N 2/2803 297/256.1 |
| 6,030,047 A | 2/2000 | Kain | |
| 6,135,553 A * | 10/2000 | Lovie | B60N 2/2821 297/250.1 |
| 6,623,074 B2 | 9/2003 | Asbach et al. | |
| 6,626,493 B2 | 9/2003 | Kain | |
| 6,811,216 B2 | 11/2004 | Sedlack | |
| 7,246,852 B2 * | 7/2007 | Balensiefer | B60N 2/2851 297/250.1 |
| 7,370,912 B2 * | 5/2008 | Williams | B60N 2/2851 297/256.11 |
| 7,604,294 B2 | 10/2009 | Jane Santamaria | |
| 7,625,043 B2 * | 12/2009 | Hartenstine | B60N 2/2806 297/250.1 |
| 7,637,568 B2 * | 12/2009 | Meeker | B60N 2/2806 297/230.14 |

(Continued)

FOREIGN PATENT DOCUMENTS

| EP | 1591305 A2 | 11/2005 |
|---|---|---|
| ES | 2411405 T3 | 7/2013 |

OTHER PUBLICATIONS

PCT International Search Report and Written Opinion completed by the ISA/US dated Apr. 5, 2018 and issued in connection with PCT/US2018/017658.

*Primary Examiner* — Syed A Islam
(74) *Attorney, Agent, or Firm* — Barnes & Thornburg LLP

(57) ABSTRACT

A child restraint is adapted to set on a passenger seat in a vehicle. The child restraint includes a seat bottom, a seat back, and a movable headrest.

12 Claims, 24 Drawing Sheets

(56) References Cited

U.S. PATENT DOCUMENTS

| | | | | |
|---|---|---|---|---|
| 7,862,117 | B2* | 1/2011 | Hutchinson | B60N 2/2806 |
| | | | | 297/250.1 |
| 8,276,988 | B2* | 10/2012 | Hartenstine | B60N 2/2821 |
| | | | | 297/250.1 |
| 8,282,165 | B2 | 10/2012 | Kespohl | |
| 8,496,293 | B2 | 7/2013 | Gaudreau, Jr. | |
| 8,573,693 | B2 | 11/2013 | Gaudreau, Jr. | |
| 8,585,138 | B2 | 11/2013 | Gaudreau, Jr. | |
| 9,022,470 | B2* | 5/2015 | Fujita | B60N 2/265 |
| | | | | 297/219.12 |
| 9,114,739 | B2* | 8/2015 | Conway | B60N 2/2863 |
| 9,162,593 | B2* | 10/2015 | Spence | B60N 2/265 |
| 9,771,005 | B2* | 9/2017 | Mo | B60N 2/22 |
| 2004/0256899 | A1 | 12/2004 | Moore et al. | |
| 2005/0212342 | A1* | 9/2005 | Kain | B60N 2/2851 |
| | | | | 297/410 |
| 2007/0120403 | A1* | 5/2007 | Drexler | B60N 2/2222 |
| | | | | 297/250.1 |
| 2009/0212613 | A1* | 8/2009 | Freeman | B60N 2/2851 |
| | | | | 297/250.1 |
| 2010/0038954 | A1* | 2/2010 | Chen | B60N 2/2812 |
| | | | | 297/468 |
| 2010/0264705 | A1* | 10/2010 | Karremans | B60N 2/2812 |
| | | | | 297/250.1 |
| 2011/0285187 | A1* | 11/2011 | Horton | B60N 2/2812 |
| | | | | 297/250.1 |
| 2012/0242129 | A1 | 9/2012 | Gaudreau, Jr. et al. | |
| 2012/0313413 | A1* | 12/2012 | Hutchinson | B60N 2/2812 |
| | | | | 297/250.1 |
| 2016/0114705 | A1* | 4/2016 | Morgenstern | B60N 2/2851 |
| | | | | 297/183.2 |

* cited by examiner

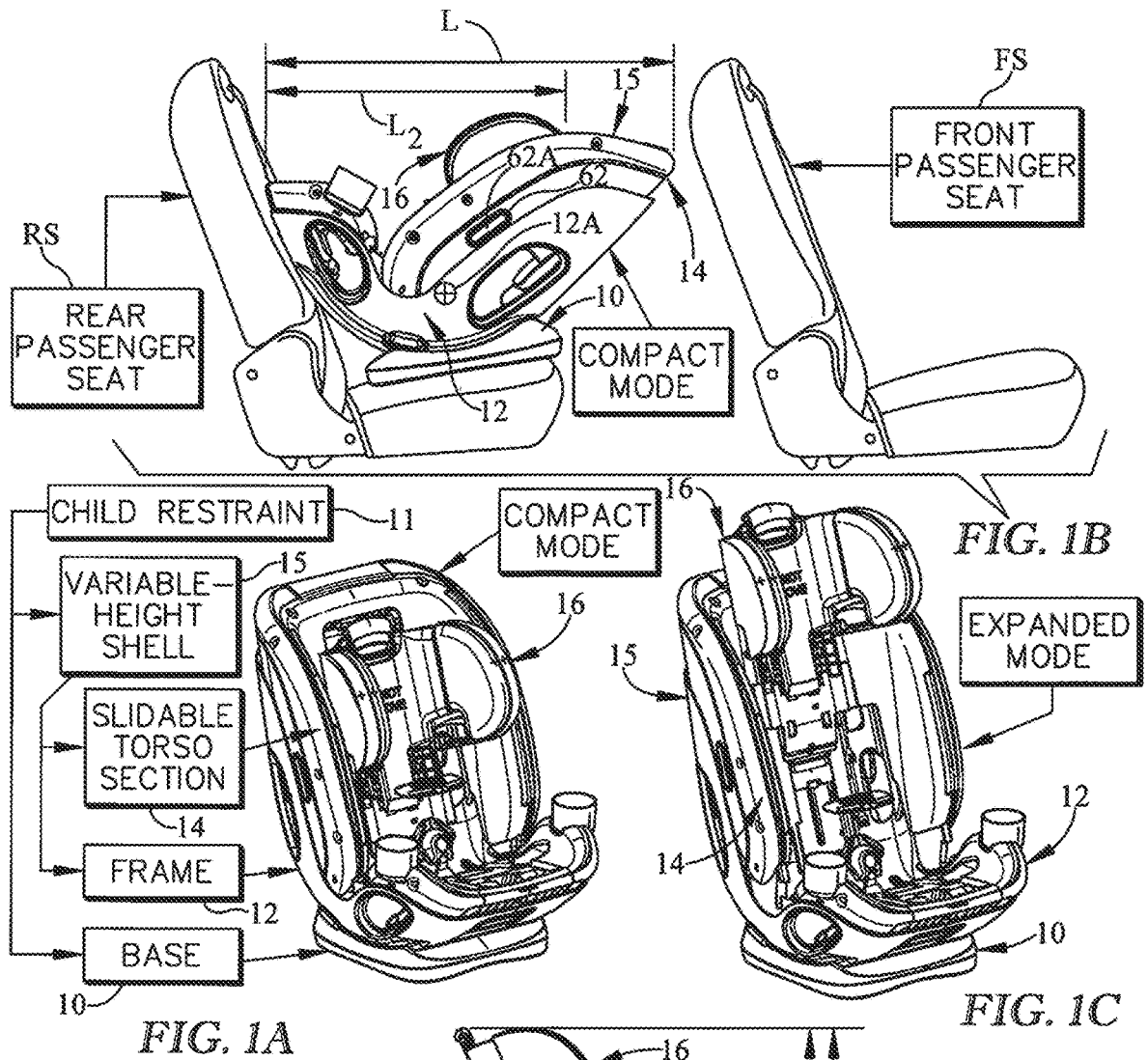
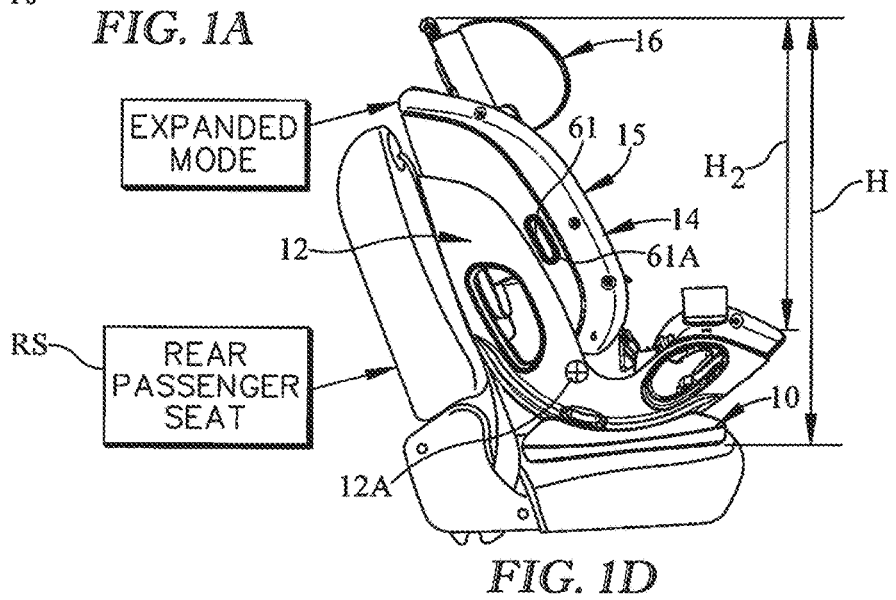
FIG. 1A
FIG. 1B
FIG. 1C
FIG. 1D

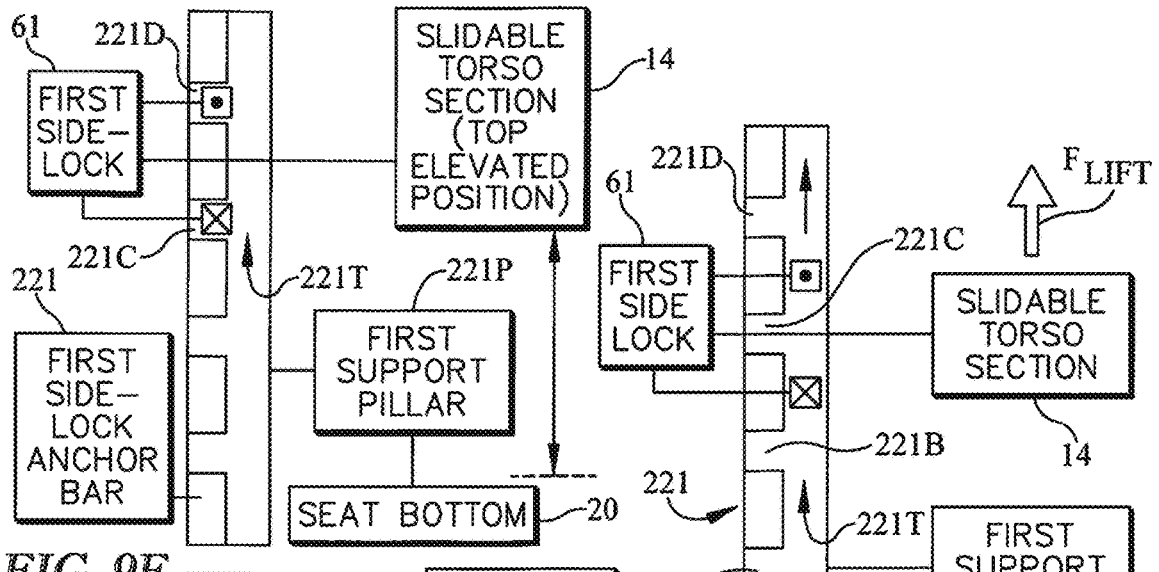
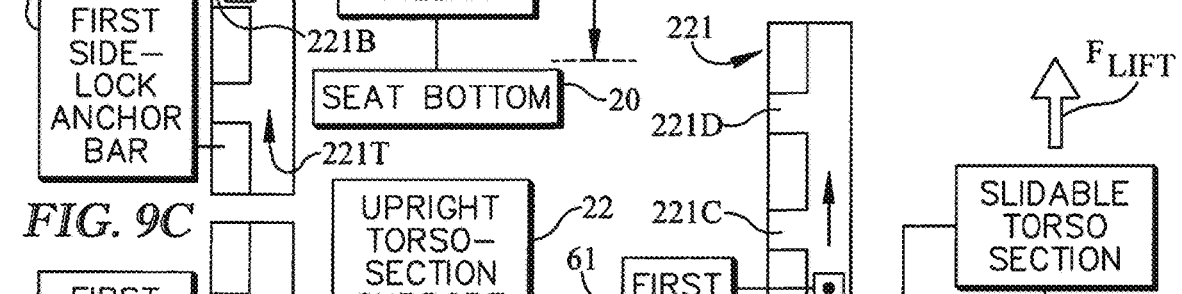
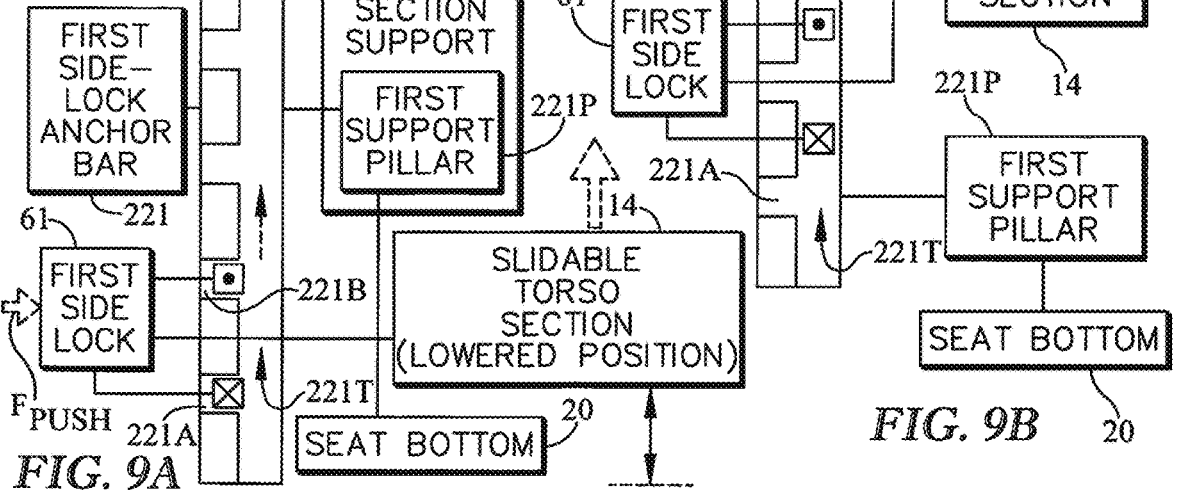
FIG. 9E
FIG. 9D
FIG. 9C
FIG. 9B
FIG. 9A

JUVENILE VEHICLE SEAT WITH ADJUSTABLE HEADREST

PRIORITY CLAIM

This application claims priority under 35 U.S.C. § 119(e) to U.S. Provisional Application No. 62/456,978, filed Feb. 9, 2017, which is expressly incorporated by reference herein.

BACKGROUND

The present disclosure relates to child restraints and in particular, to juvenile seats for use on passenger seats in vehicles. More particularly, the present disclosure relates to juvenile seats that are adjustable in size to accommodate growing children.

SUMMARY

According to the present disclosure, a child restraint adapted to set on a passenger seat in a vehicle. The child restraint includes a seat bottom, a seat back arranged to extend upwardly from the seat bottom, and a head receiver including a headrest.

In illustrative embodiments, the child restraint includes a variable-height shell formed to include a child-receiving space that can be expanded and contracted in size at the option of the caregiver. The variable-height shell includes a frame and a torso section.

In illustrative embodiments, the frame is mounted on a base that is included in the child restraint and adapted to set on the passenger seat. The frame is formed to include the seat bottom and a upright torso-section support that is arranged to extend upwardly from a rear edge of the seat bottom. The torso section is mounted for up-and-down sliding movement on the upright torso-section support of the frame. The child-receiving space is expanded in size in response to upward movement of the slidable torso section on the torso-section support of the frame. The child-receiving space is contracted in size in response to downward movement of the slidable torso section on the torso-section support of the frame.

In illustrative embodiments, the variable-height shell further includes a torso-section lock system comprising means for releasably locking the slidable torso section to the upstanding torso-section support of the frame in one of several elevated positions selected by a caregiver and located above the seat bottom to establish the elevation of the slidable torso section relative to the seat bottom of the frame. The slidable torso section includes a center wing support, a first side wing coupled to one side of the center wing support, and a second side wing coupled to an opposite side of the center wing support.

In illustrative embodiments, the torso-section lock system includes a first side lock mounted on the first side wing of the slidable torso section for movement relative to the first side wing between a locked position engaging a first side of the upright torso-section support and an unlocked position disengaging the first side of the upright torso-section support. The torso-section lock system also includes a second side lock mounted on the second side wing of the slidable torso section for movement relative to the second side wing between a locked position engaging on opposite second side of the upright torso-section support and an unlocked position disengaging the opposite second side of the upright torso-section support. A caregiver can operate the first and second side locks simultaneously to free the slidable torso section to move up and down on the upstanding torso-section support of the frame so as to change the elevation of the torso section relative to the seat bottom so that the child-receiving space is expanded or contracted.

In illustrative embodiments, the upright torso-section support of the frame includes a center panel coupled to a rear edge of the seat bottom, a first side-lock anchor bar coupled to a first side of the center panel, and a second side-lock anchor bar coupled to an opposite second side of the center panel. Each side-lock anchor bar is formed to include several lock receivers and each lock receiver is associated with one of the several elevated positions of the slidable torso section on the upright torso-section support of the frame. In use, a caregiver operates the first and second side locks to disengage the companion first and second side-lock anchor bars to free the slidable torso section for up-and-down movement on the upright torso-section support relative to the seat bottom. Then, to establish a selected elevated position of the torso section above the seat bottom of the frame, the caregiver aligns the first side lock with a selected lock receiver in the first side-lock anchor bar and simultaneously aligns the second side lock with a companion selected lock receiver in the second side-lock anchor bar to cause the first and second side locks to engage their respective lock receivers so that the slidable torso section is retained in a stationary elevated position selected by the caregiver on the upright torso-section support of the frame above the seat bottom of the frame.

In illustrative embodiments, the headrest of the child restraint is mounted for up-and-down movement relative to the upright torso-section support of the frame and also for up-and-down movement relative to the slidable torso section. The headrest can be moved relative to the slidable torso section and relative to the seat bottom at the option of the caregiver to support the head of a child seated on the seat bottom even though the slidable torso section has been moved relative to the seat bottom to expand or contract the size of the child-receiving space of the variable-height shell.

In illustrative embodiments, the head receiver of the child restraint also includes a headrest-height controller that is coupled to the headrest to move up and down therewith relative to the slidable torso section and to the seat bottom. The headrest-height controller is configured to mate with the center panel of the upright torso-section support of the frame in one of several elevated positions selected by the caregiver to establish the elevation of the headrest relative to the slidable torso section and to the underlying seat bottom. The torso-section lock system and the headrest-height controller are operated independently of one another by a caregiver to establish (1) the elevation of the slidable torso section relative to the seat bottom of the frame and (2) the position of the headrest relative to the slidable torso section and the seat bottom of the frame.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1A is a perspective view of a child restraint including a variable-height shell in accordance with the present disclosure showing that shell in a COMPACT mode to provide a relatively small child-receiving space and showing that the variable-height shell comprises a stationary base, a frame mounted for movement on the base between a RECLINED position as shown in FIG. 1B and an UPRIGHT position as shown in FIG. 1D, and a slidable torso section mounted for up-and-down movement on the frame as suggested in FIGS. 2 and 3;

FIG. 1B is a side elevation view of a passenger compartment of a vehicle showing that the child restraint of FIG. 1A is sized and shaped to be placed on a rear passenger seat of a vehicle in a REARWARD-FACING orientation while the variable-height shell remains in the COMPACT mode without contacting the nearby front passenger seat and showing that the frame has been rotated on the underlying base about a horizontal axis of rotation by a caregiver to cause the frame to recline to assume the RECLINED position while the slidable torso section remains in the same LOWERED position on the frame shown in FIG. 1A;

FIG. 1C is a perspective view similar to FIG. 1A showing that the variable-height shell has been reconfigured by a caregiver to establish an EXPANDED mode of the variable-height shell in which the height of the variable-height shell has been increased in the field by the caregiver to enlarge the child-receiving space to seat a relatively larger child and showing that the slidable torso section has been moved upwardly on the frame to a TOP ELEVATED position and showing that the frame has been rotated on the underlying base about its axis of rotation by a caregiver to cause the frame to move from the RECLINED position shown in FIG. 1B to the UPRIGHT position shown in FIG. 1C;

FIG. 1D is a side elevation of a passenger compartment of the vehicle of FIG. 1B showing that the child restraint of FIG. 1C in the EXPANDED mode has been placed on the rear passenger seat of the vehicle in a FORWARD-FACING orientation;

FIG. 2 is a perspective view of the variable-height shell in the COMPACT mode showing that the slidable torso-section of the variable-height shell has been moved downwardly on an upright torso-section support included in the frame and retained in a LOWERED position near a seat bottom also included in the frame to contract in size a child-receiving space provided in the variable-height shell to hold an infant or other very small child when the child restraint is placed in a REARWARD-FACING orientation on a rear passenger seat in a vehicle as shown in FIG. 1B without causing an upper end of the slidable torso section of the variable-height shell to contact a rearward-facing surface on a companion front passenger seat in the vehicle and suggesting that the variable-height shell also includes a torso-section lock system coupled to the slidable torso section to move up and down therewith relative to the frame for locking the slidable torso section in each of several positions on the frame under the control of a caregiver;

FIG. 3 is a perspective view similar to FIG. 2 showing the variable-height shell in the EXPANDED mode and showing the slidable torso section of the variable-height shell after the first and second side locks of the torso-section lock system have been unlocked by a caregiver and the slidable torso section has been slid upwardly by the caregiver on the frame to a TOP ELEVATED position so as to lie further away from the seat bottom of the frame and to expand the size of the child-receiving space provided in the variable-shape shell to accommodate a relatively taller child when the child restraint is placed in a FORWARD-FACING orientation on a rear passenger seat in the vehicle as shown in FIG. 1D and suggesting that the child restraint also includes a head receiver comprising a headrest-mount platform that is coupled to the frame, a movable headrest that can be moved by a caregiver relative to the frame and relative to the slidable torso section, and a headrest-height controller for use by a caregiver to move the headrest relative to the frame and relative to the slidable torso section;

FIG. 4 is an exploded perspective assembly view of illustrative components that cooperate to form the child restraint of FIGS. 1-3 and showing that the frame comprises a seat bottom and an upright torso-support section arranged to extend upwardly away from a rear edge of the seat bottom and formed to include a central platform-receiving cavity for receiving a headrest-mount platform included in the head receiver when the head receiver is coupled to the upright torso-support section of the frame and showing that the frame is a monolithic component made of a plastics material;

FIG. 5 is a front elevation view of the frame of FIG. 4 showing that the upright torso-support section of the frame comprises a vertical first support pillar, a laterally spaced-apart vertical second support pillar, and a pillar bridge that lies between the first and second support pillars to form a boundary of the platform-receiving cavity and showing that a first side-lock anchor bar is coupled to a left outer edge of the first support pillar and configured to mate with a first side lock of the torso-section lock system as suggested in FIGS. 9A and 10, and that a second side-lock anchor bar is coupled to a right outer edge of the second support pillar and configured to mate with the second side lock of the torso-section lock system as suggested in FIG. 10;

FIG. 6 is an enlarged perspective view of a circled region in FIG. 5 suggesting diagrammatically that the first side lock is coupled to the slidable torso section that is supported for up-and-down movement on the upright torso-support section of the frame relative to the seat bottom so that the first side lock is moved up and down relative to the adjacent first side-lock anchor bar during up-and-down movement of the slidable torso section on the frame;

Figure 2:
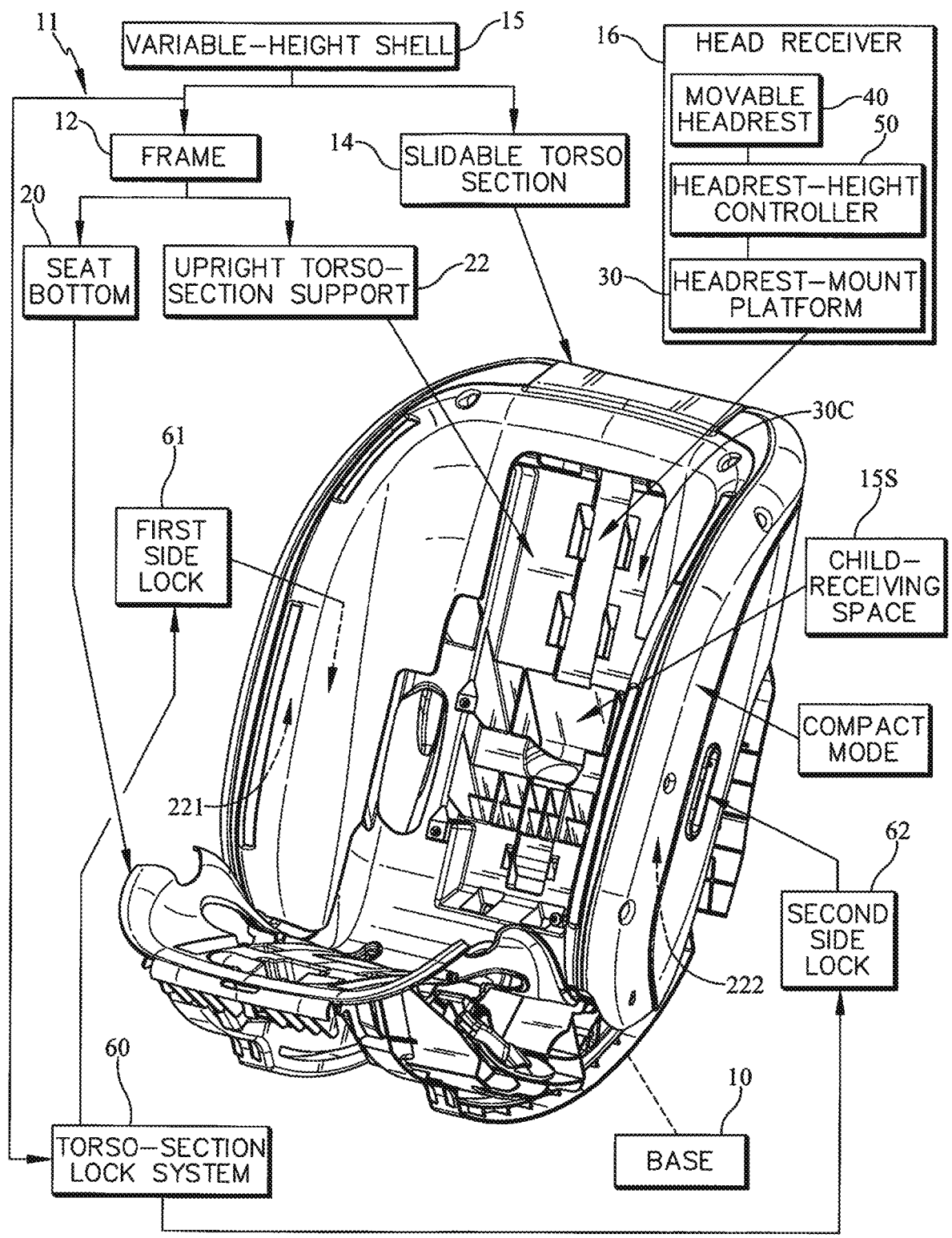
Figure 3:
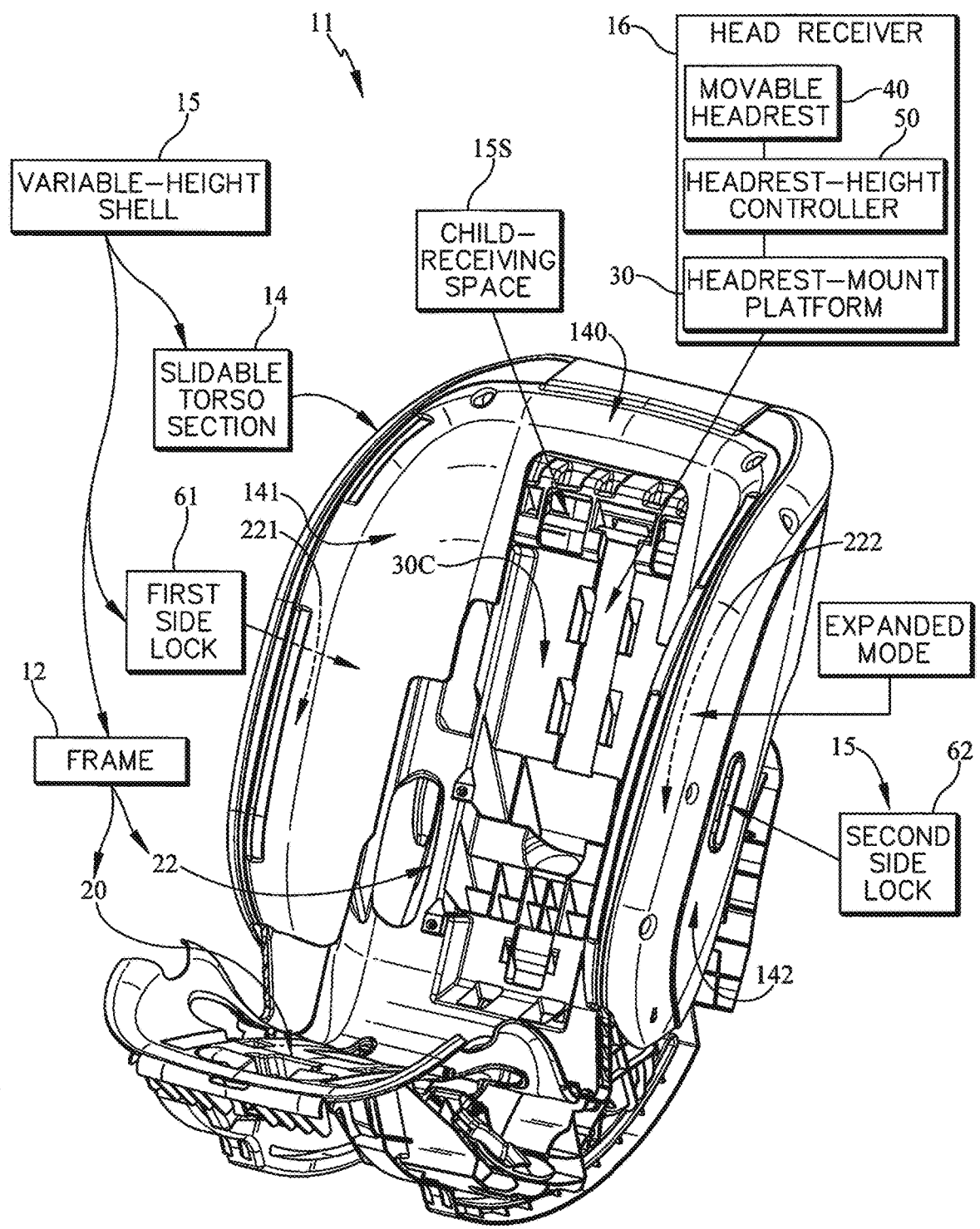
Figure 10:
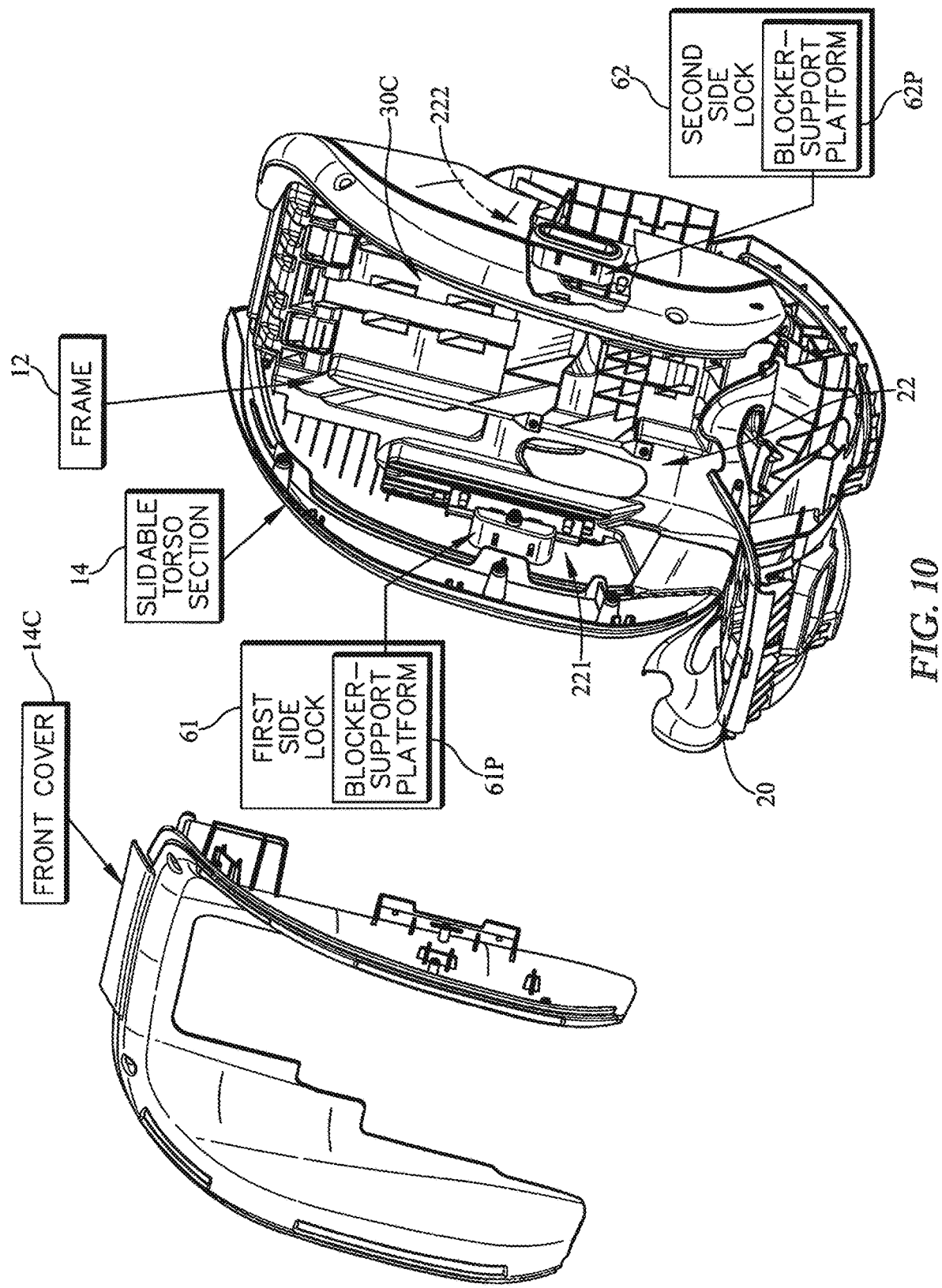
Figure 11:
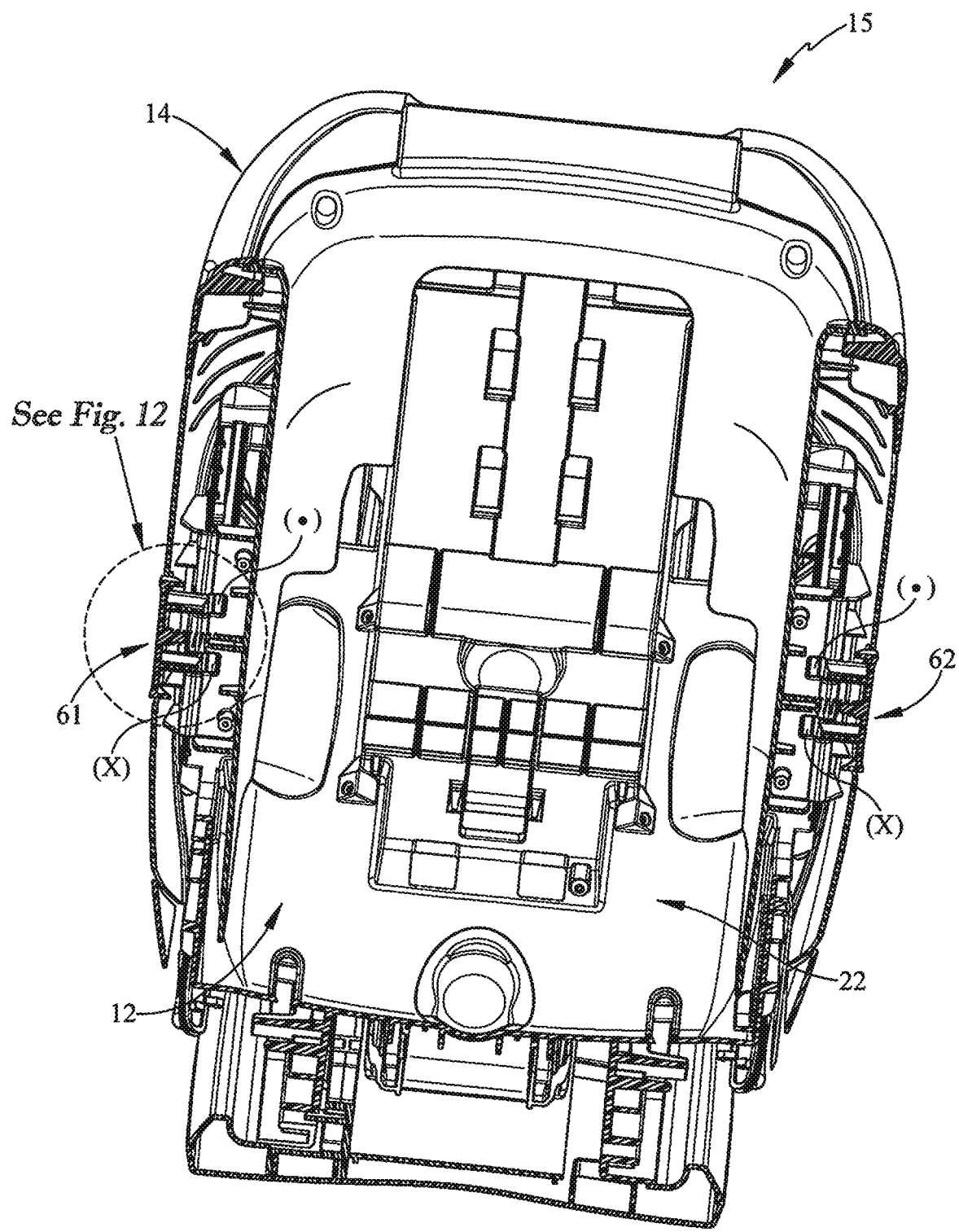
Figure 12:
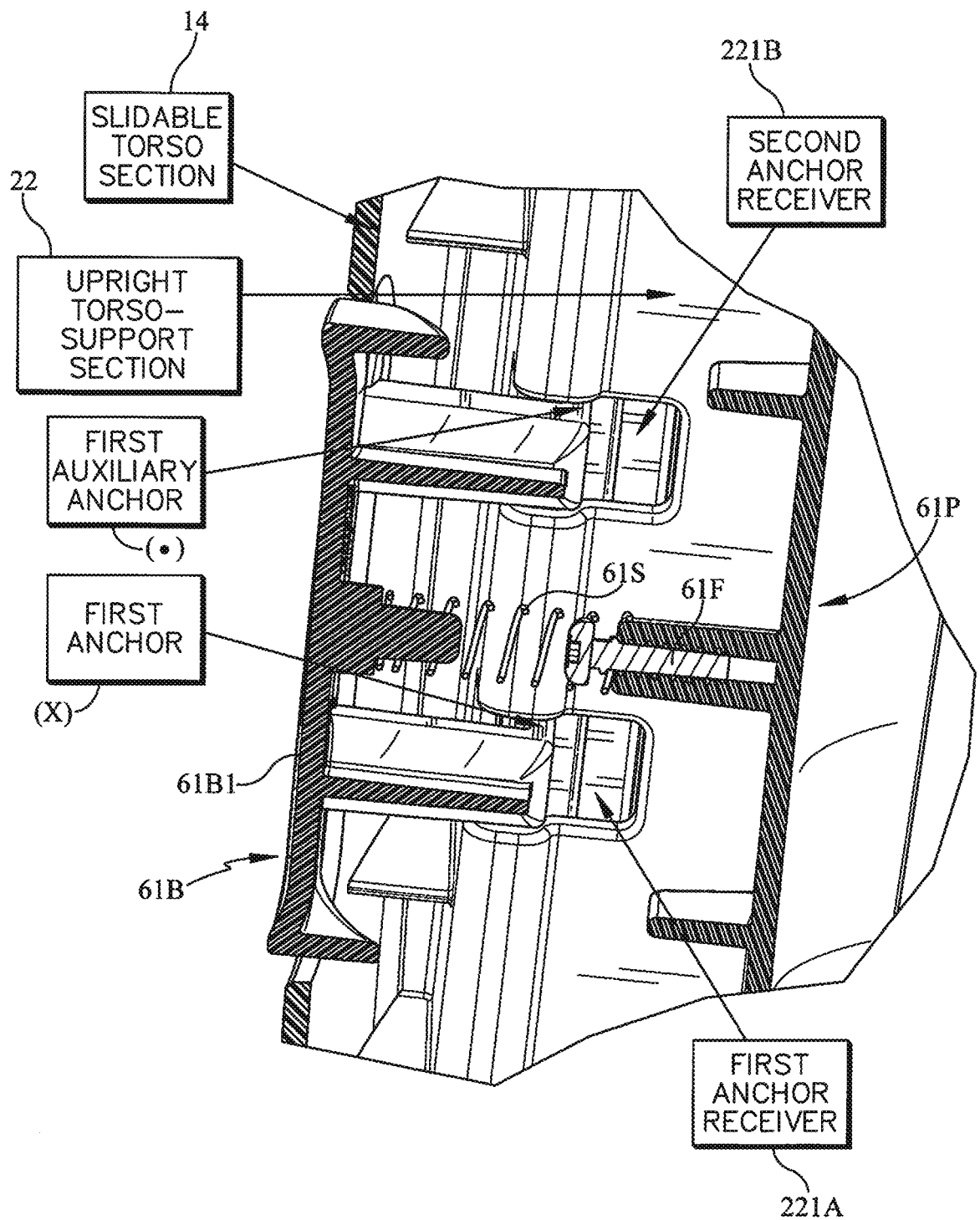
Figure 13:
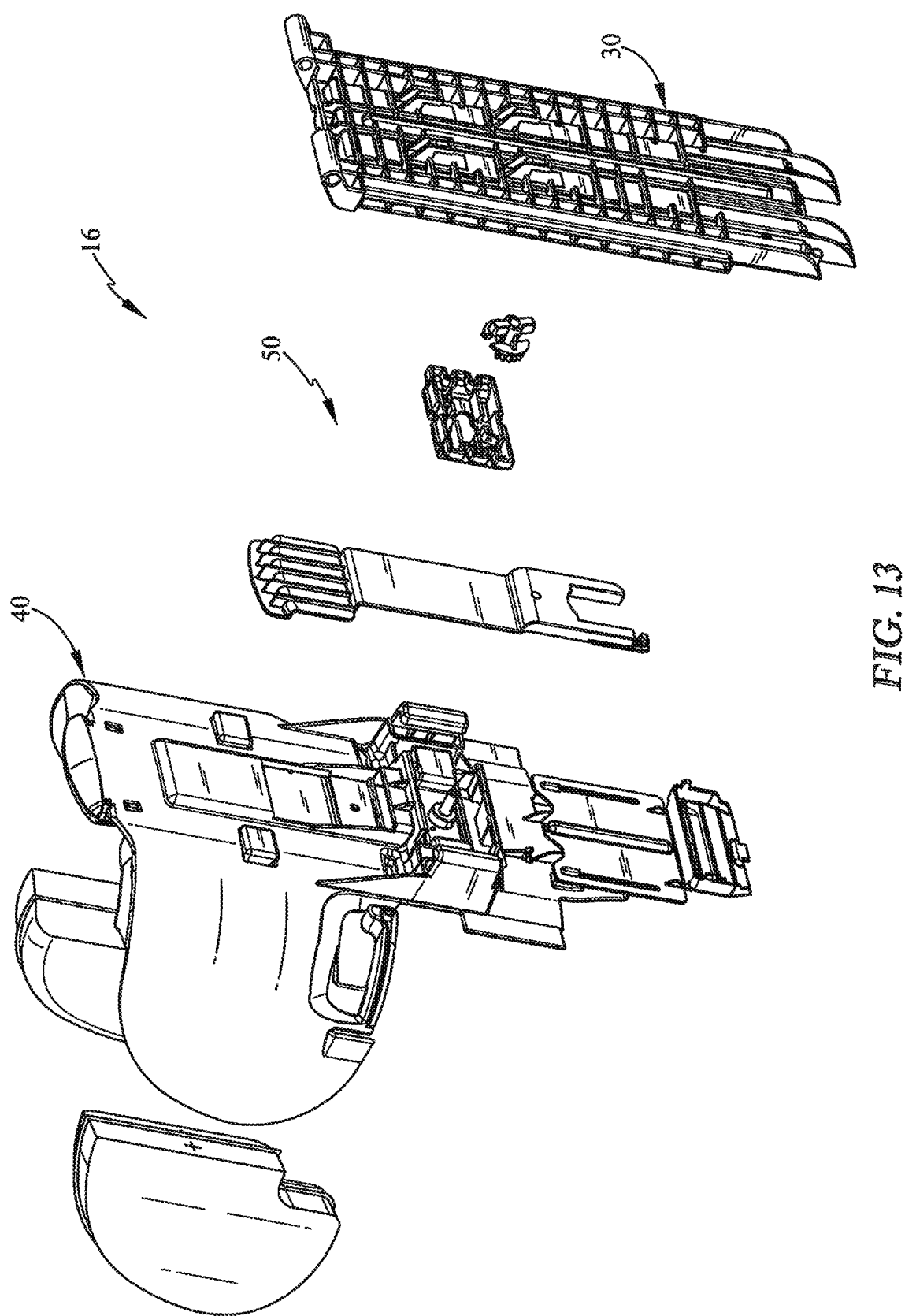
Figure 14:
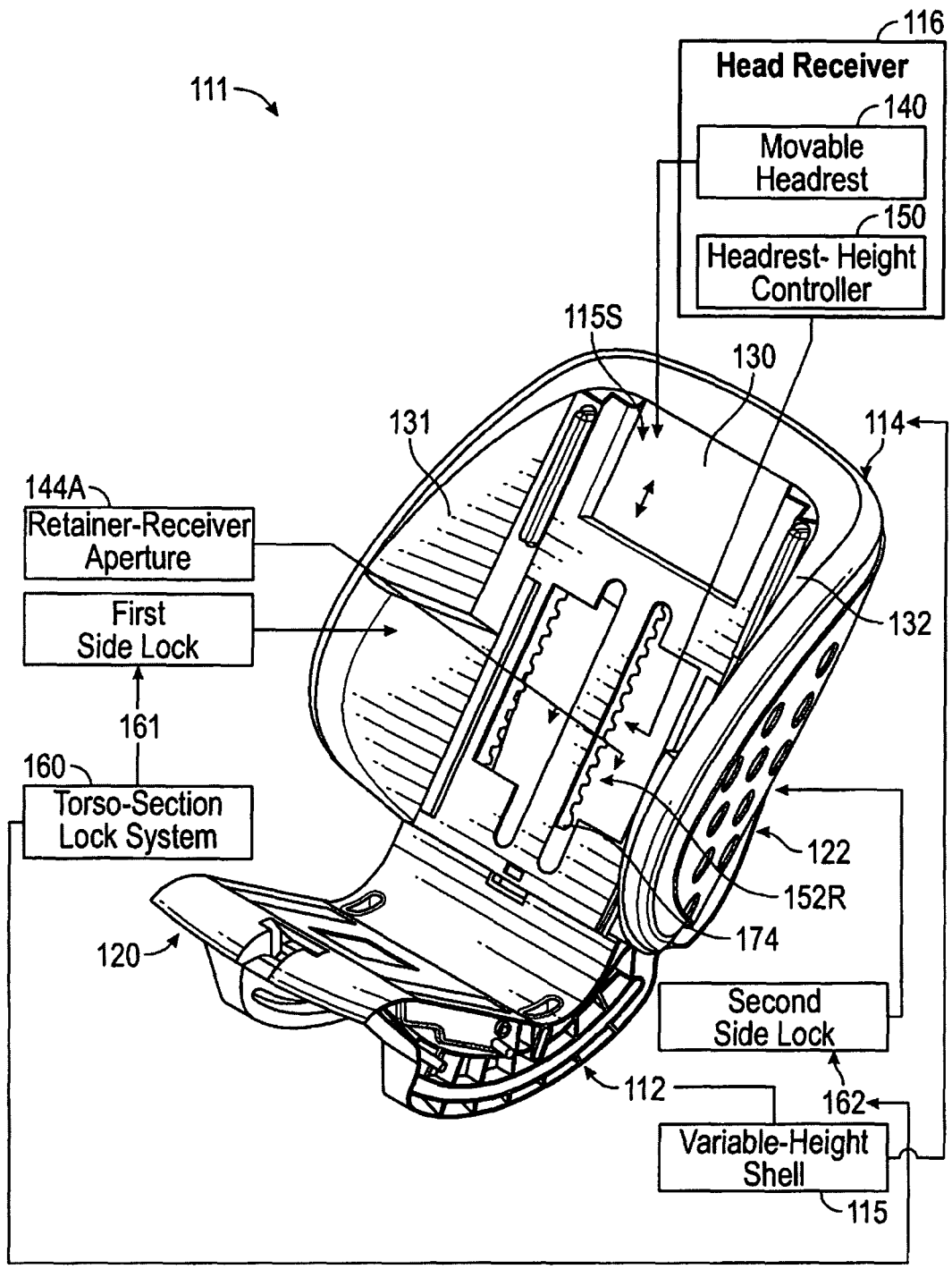
Figure 15:
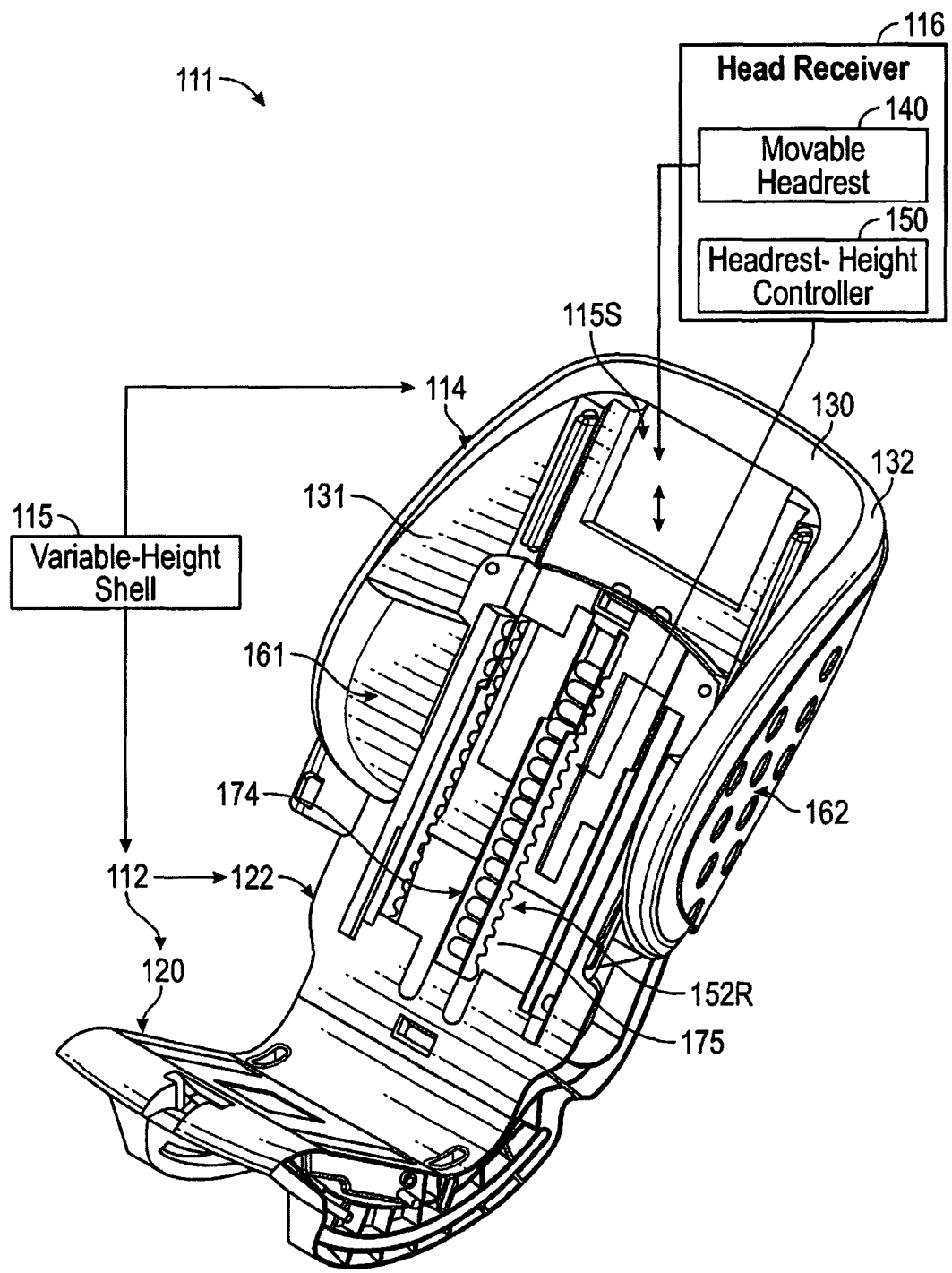
Figure 16:
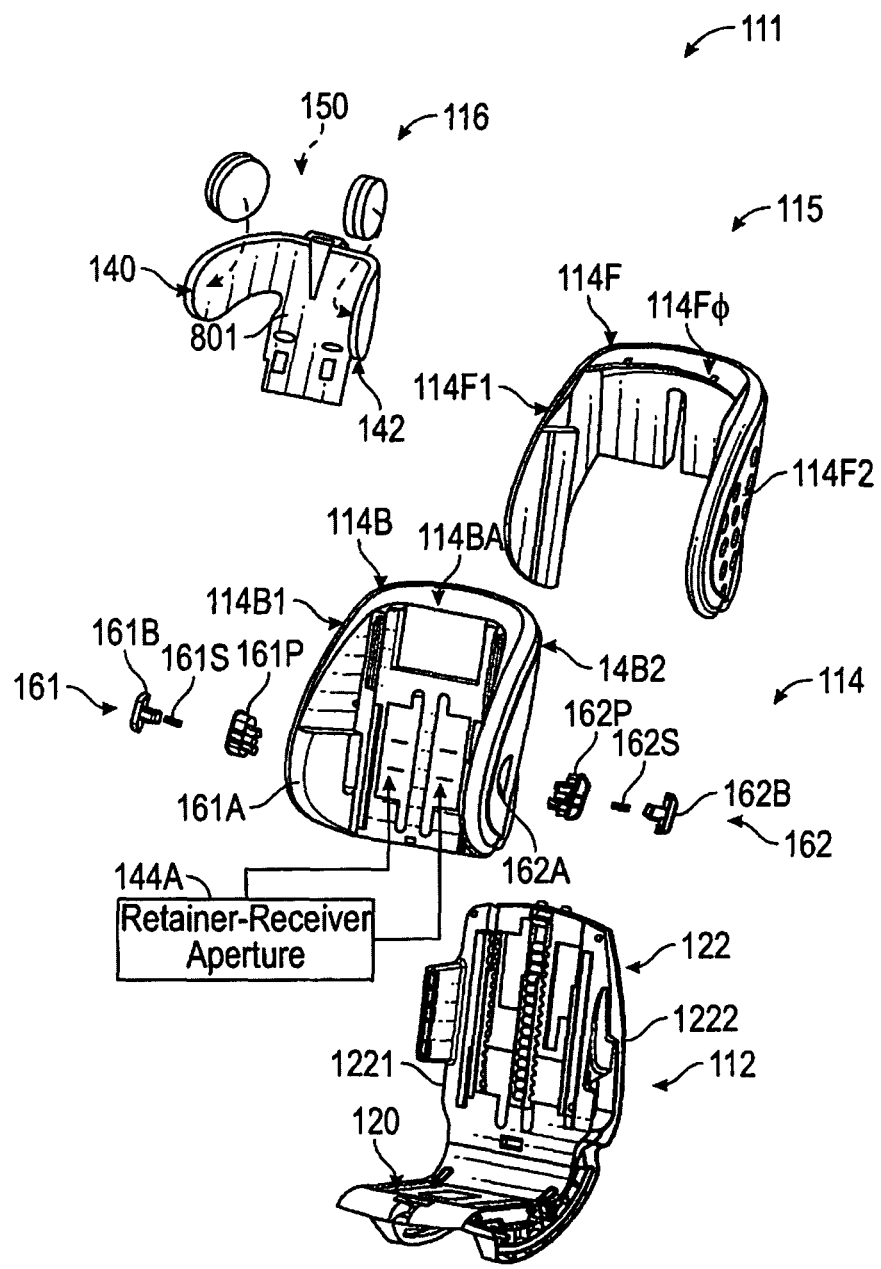
Figure 17:
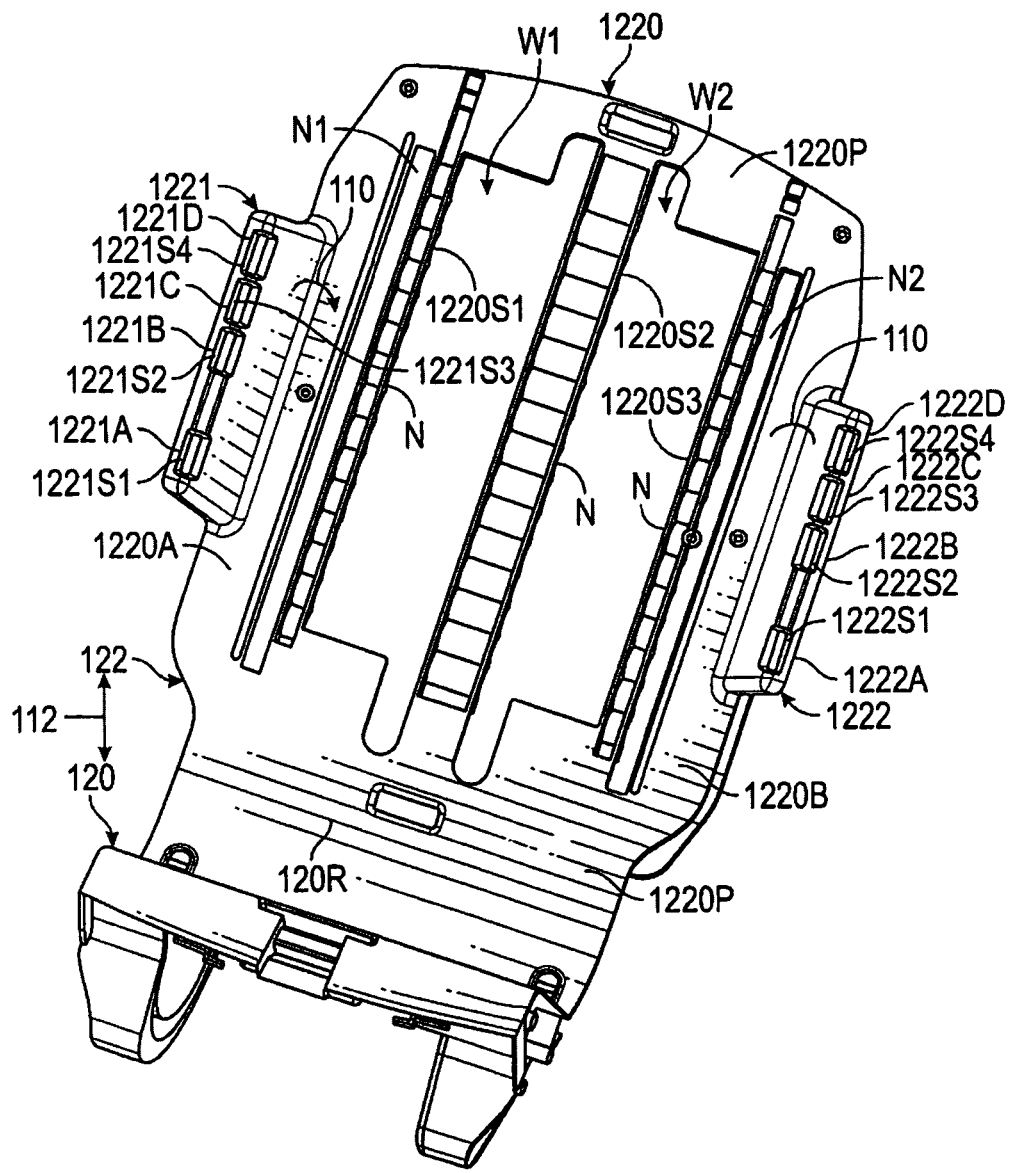
Figure 18:
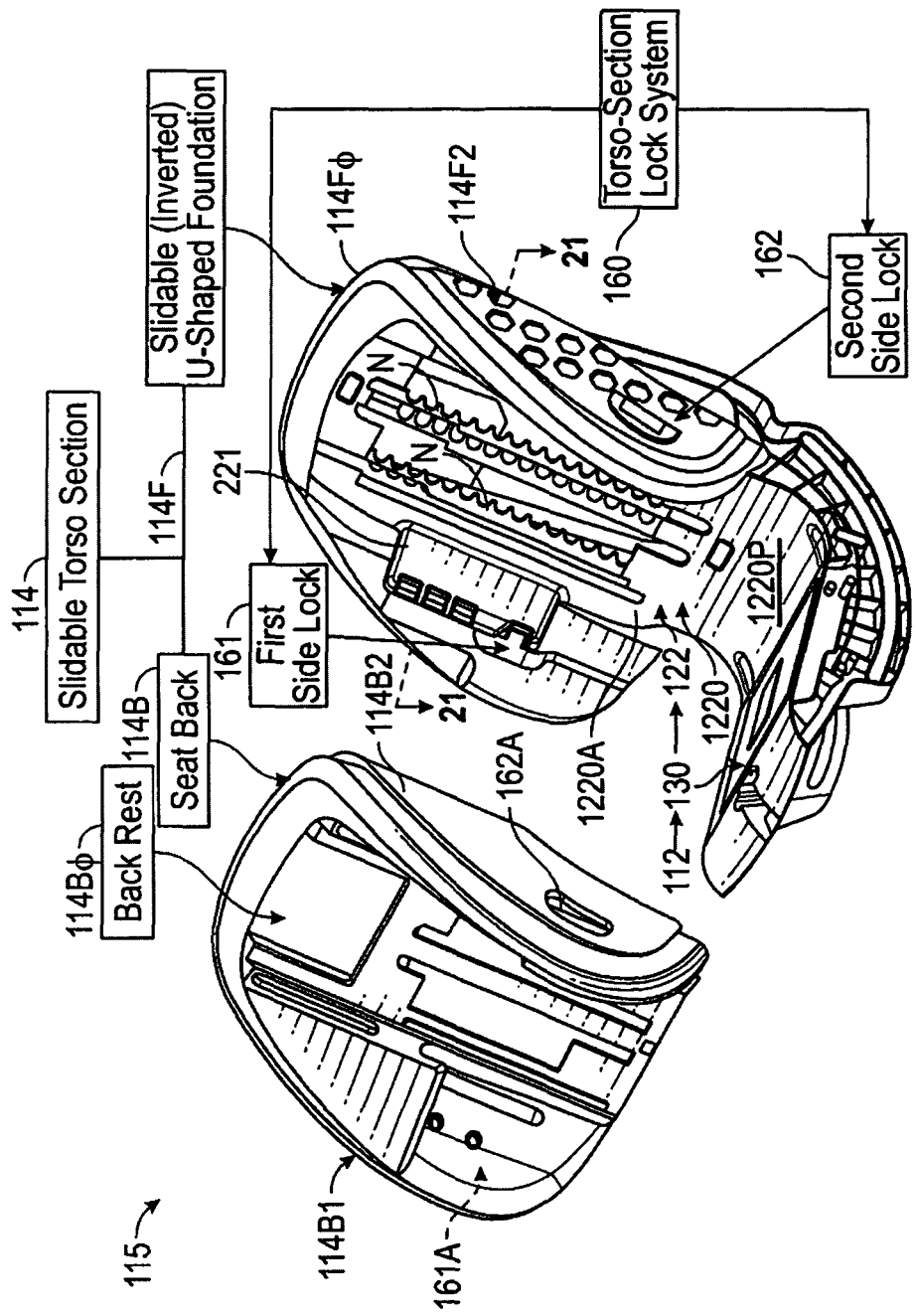
Figure 19:
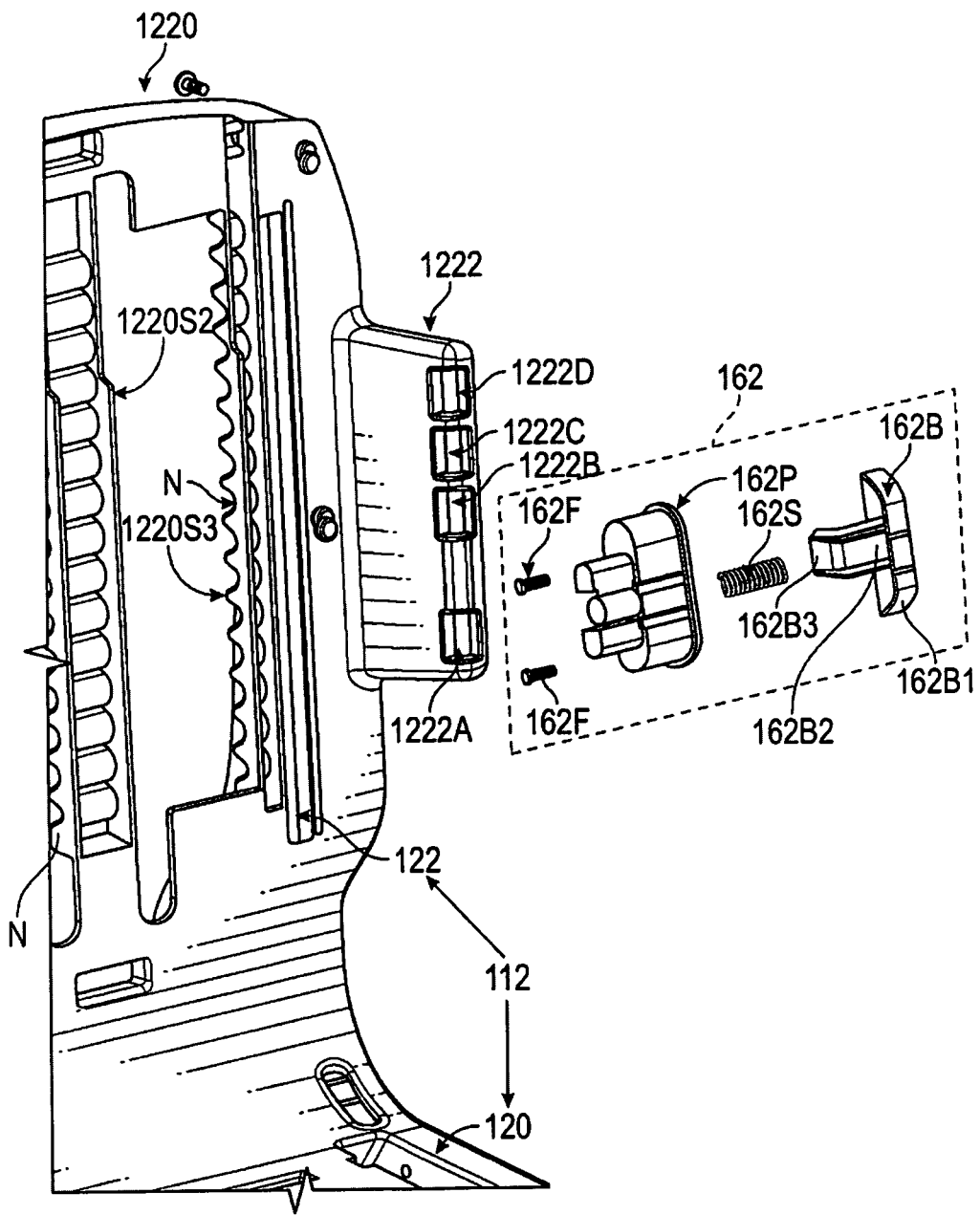
Figure 20:
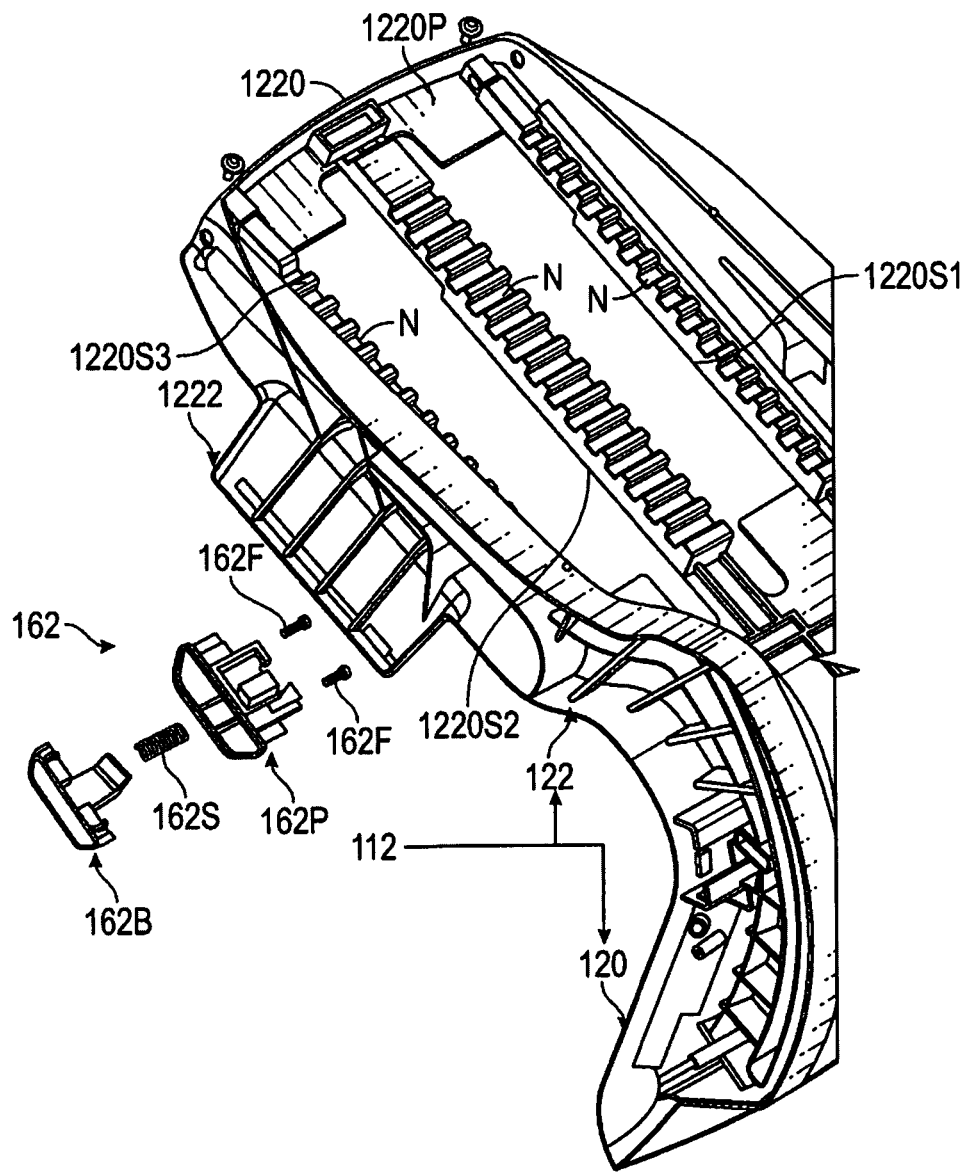
Figure 21:
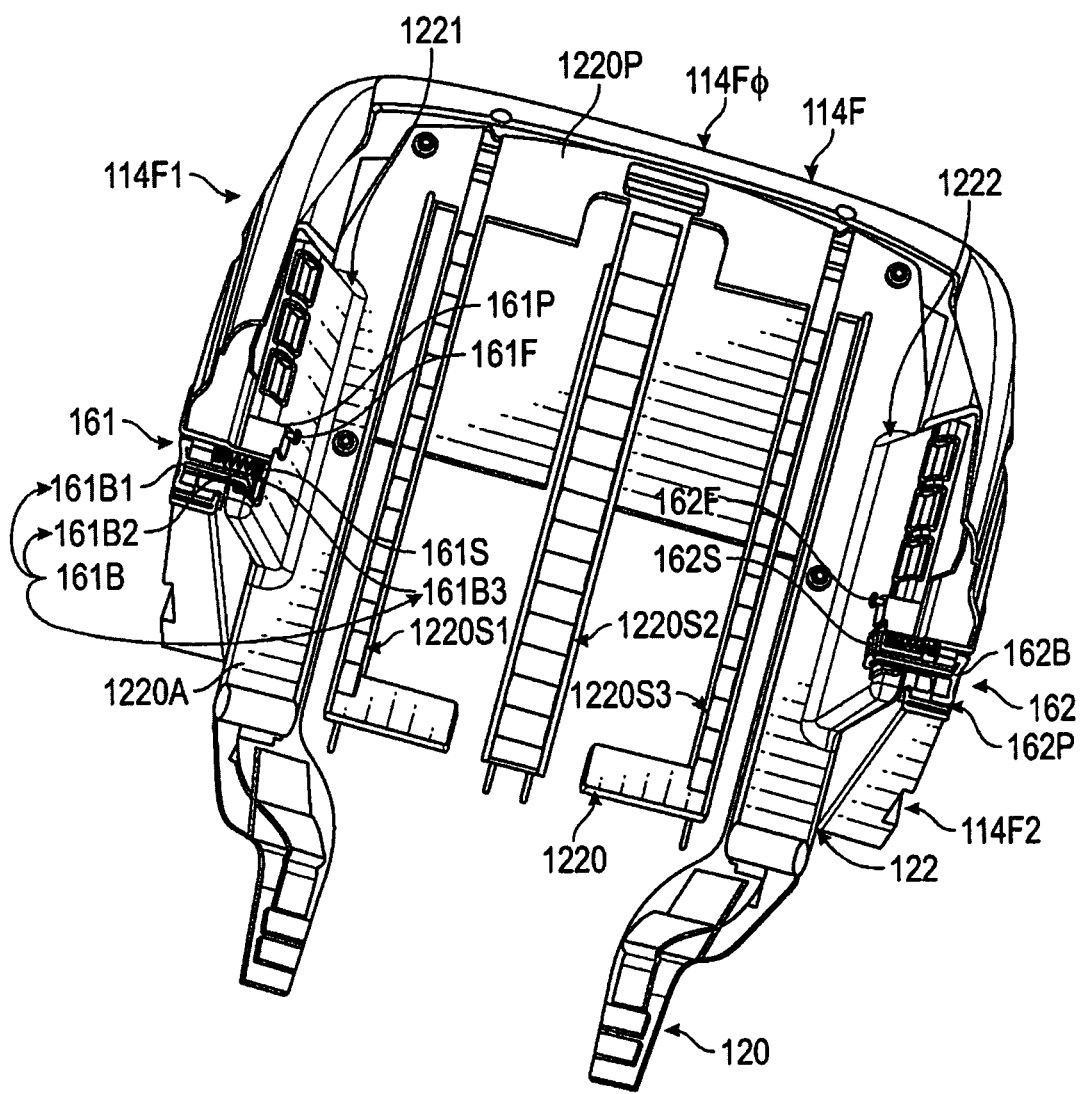
Figure 22:
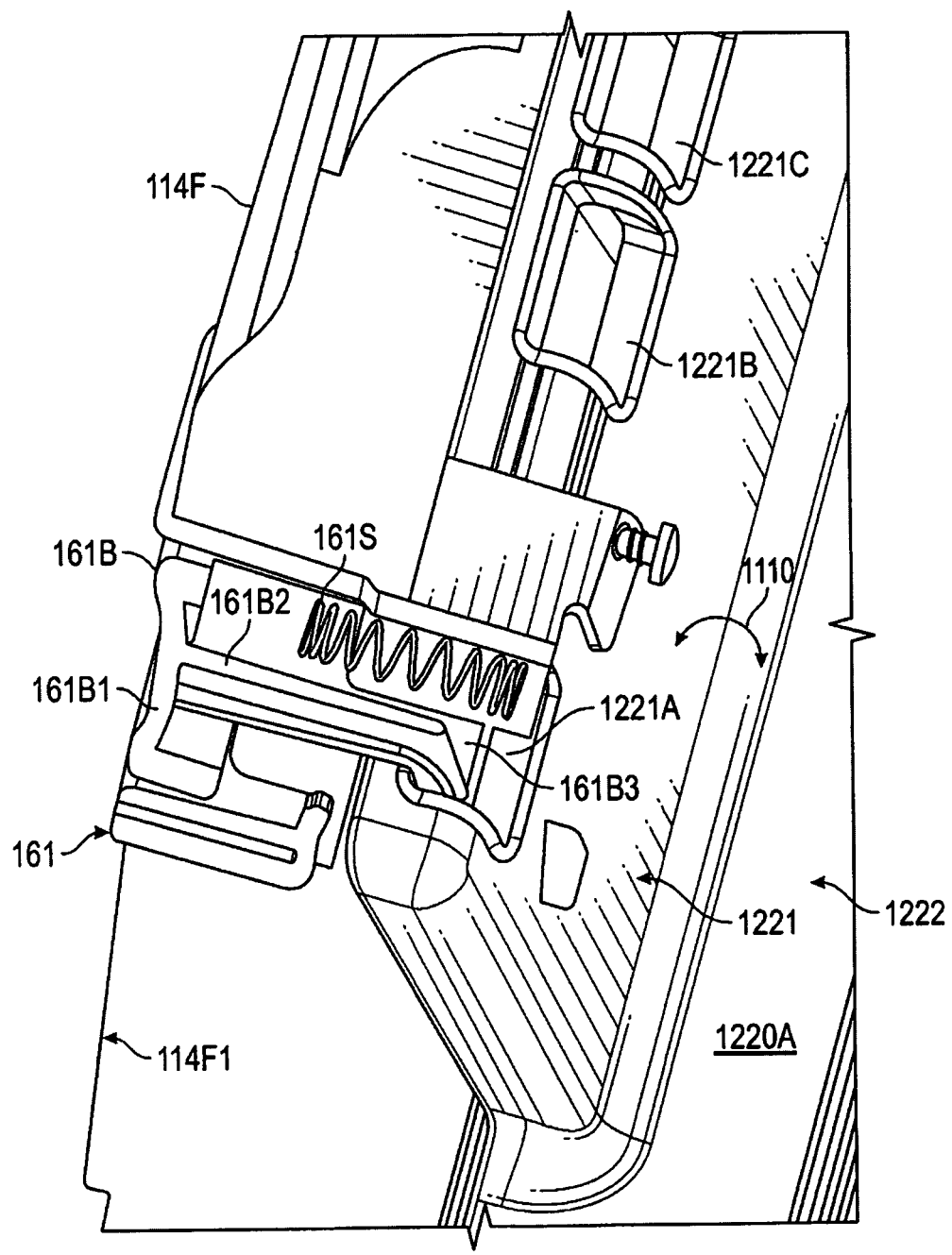
Figure 23:
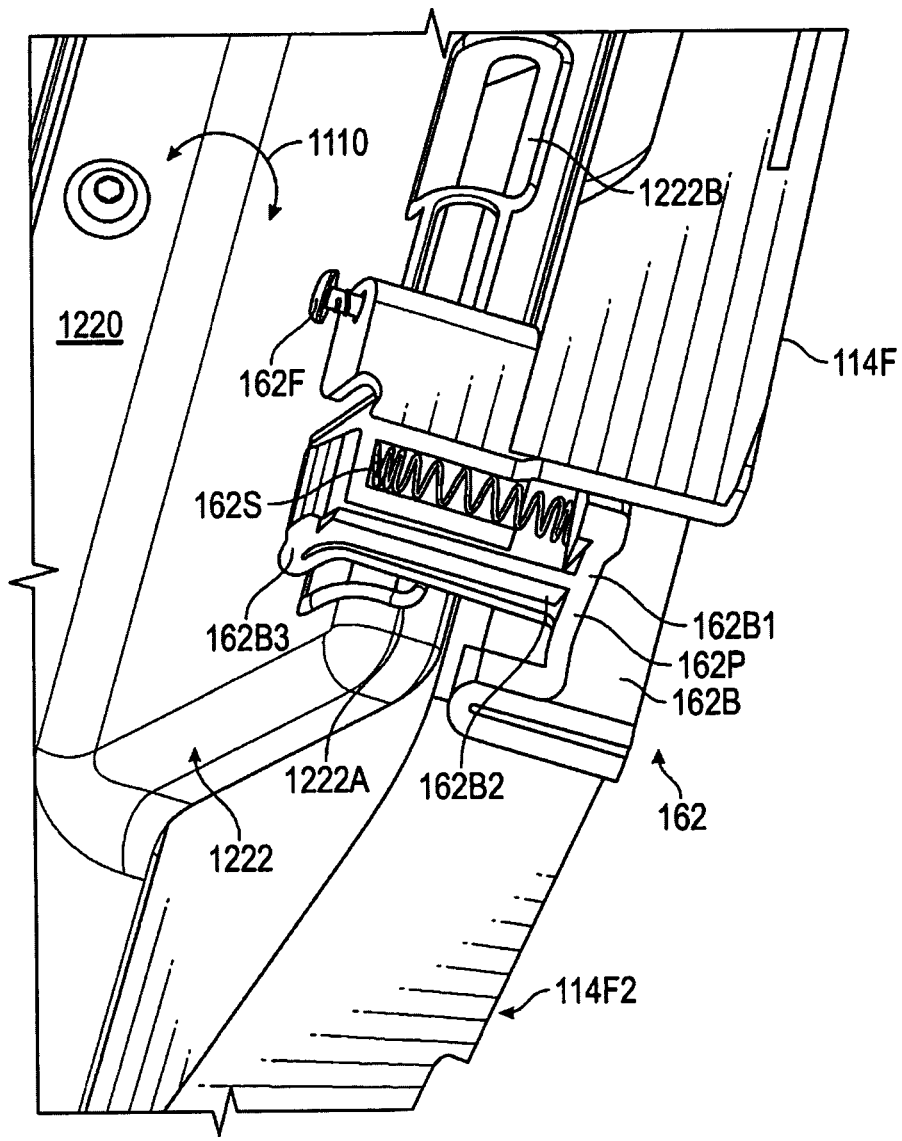
Figure 24:
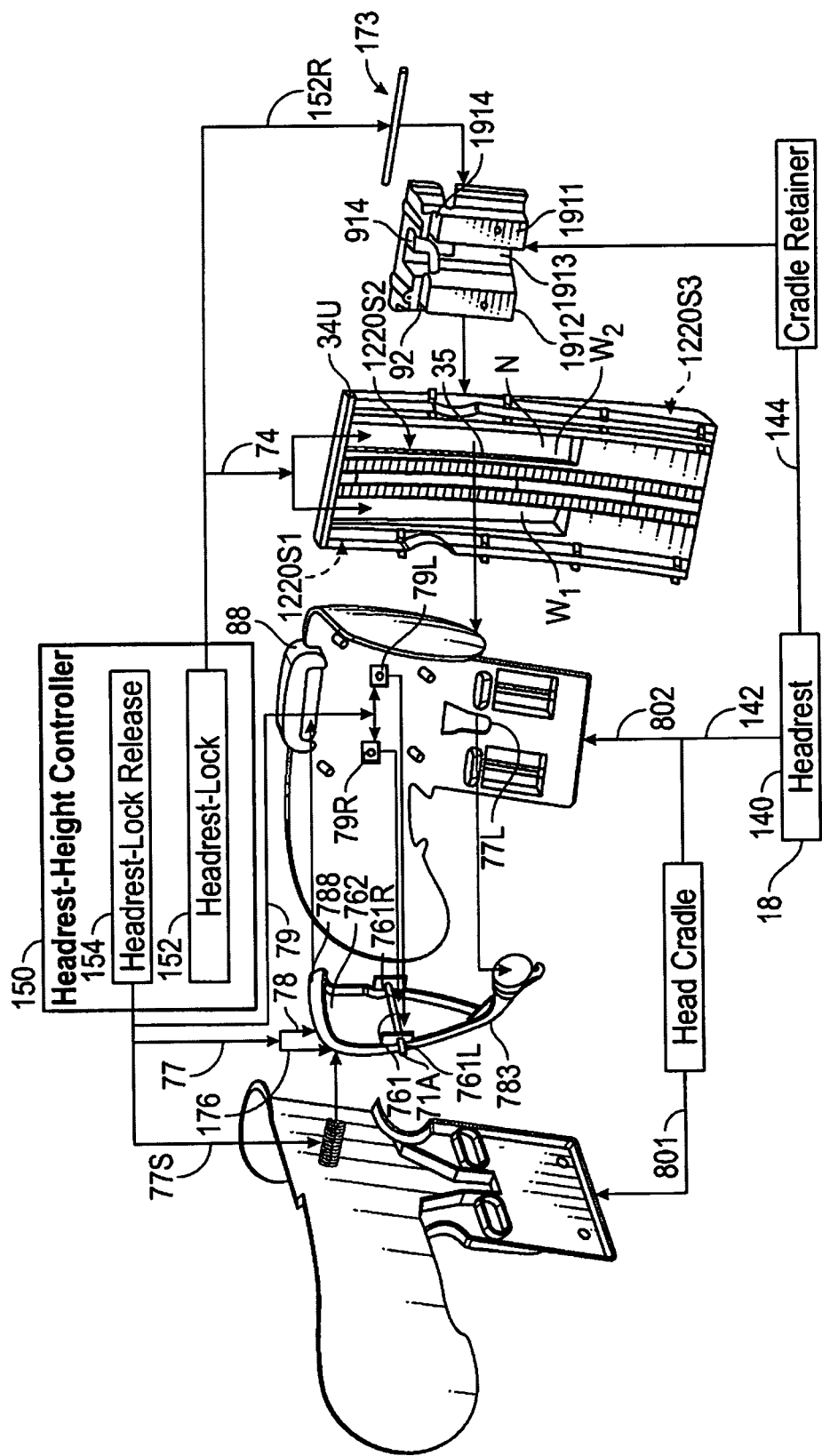

FIGS. 9A-9E comprise a series of diagrammatic views showing upward movement of the slidable torso section relative to the upright torso-support section of the frame from a LOWERED position near the seat bottom as suggested in FIG. 9A when the variable-height shell is in the COMPACT mode as shown in FIGS. 1A and 1B, first to a FIRST ELEVATED position as suggested in FIG. 9C, and then to a TOP ELEVATED position as suggested in FIG. 9E when the variable-height shell is in the EXPANDED mode as shown in FIGS. 1C and 1D;

FIG. 9A is a diagrammatic view showing that an anchor (X) included in the first side lock extends into a first anchor receiver formed in the first side-lock anchor bar and an auxiliary anchor (●) also included in the first side lock extends into a neighboring second anchor receiver formed in the first side-lock anchor bar to retain the slidable torso section in the LOWERED position on the upright torso-section support of the frame;

FIG. 9B is a view similar to FIG. 9A showing that the anchor (X) and the auxiliary anchor (●) of the first side lock have exited the first and second anchor receivers in response to application of a pushing force on a touch pad included in the first side lock (see FIG. 7) by a caregiver and begun to move upwardly in an anchor-travel channel formed in the first side-lock anchor bar as the slidable torso section moves upwardly away from the seat bottom in response to application of a lifting force on the slidable torso section by the caregiver;

FIG. 9C is a view similar to FIGS. 9A and 9B showing that the first side-lock anchor (X) now extends into the second anchor receiver formed in the first side-lock anchor bar and the first side-lock auxiliary anchor (●) now extends into the neighboring third anchor receiver formed in the first side-lock anchor bar to retain the slidable torso section in the FIRST ELEVATED position on the upright torso-section support of the frame;

FIG. 9D is a view similar to FIGS. 9A-9C showing that the anchor (X) and the auxiliary anchor (●) have exited the second and third anchor receivers as the touch pad is pushed inwardly again by a caregiver and showing that the anchor and auxiliary anchor have begun to move upwardly in the anchor-travel channel formed in the first side-lock anchor bar as the slidable torso section moves upwardly toward the TOP ELEVATED position shown in FIG. 9E;

FIG. 9E is a view similar to FIGS. 9A-9D showing that the first side-lock anchor (X) now extends into the third anchor receiver formed in the first side-lock anchor bar and the first side-lock auxiliary anchor (●) now extends into the neighboring fourth anchor receiver formed in the first side-lock anchor bar to retain the slidable torso section in the TOP ELEVATED position on the upright torso-section support shown illustratively in FIG. 3;

FIG. 10 is a perspective view of the variable-shape shell of the child restraint shown in FIG. 2 with a front cover of the slidable torso section removed to show that a blocker-support platform (see FIG. 7) of the first side lock is coupled to the slidable torso section to move up and down with the slidable torso section relative to the frame with a portion of the right side of the slidable torso section broken away to reveal that the blocker-support platform of the second side lock is coupled to the slidable torso section to move up and down with the slidable torso section relative to the frame;

FIG. 11 is an enlarged view of a portion of the child restraint shown in FIG. 2 with a left-side portion of the front cover of the slidable torso section removed to show the anchor of the first side lock extended into the first anchor receiver formed in the first side-lock anchor bar and with a right-side portion of the front cover of the slidable torso section removed to show the anchor of the second side lock extended into the first anchor receiver formed in the second side-lock anchor bar;

FIG. 12 is an enlarged view of the circled region of FIG. 11;

FIG. 13 is an exploded perspective assembly view of illustrative components that cooperate to form the head receiver shown diagrammatically in FIGS. 2 and 3;

FIGS. 14-24 show a child restraint in accordance with another embodiment of the present disclosure;

FIG. 14 is a perspective view of a child restraint including (1) a frame having a seat bottom as shown in FIG. 17, (2) a slidable torso section mounted for up-and-down sliding movement on an upright torso-section support that is included in the frame and arranged to extend upwardly from the seat bottom, (3) a torso-section lock system arranged to move up and down with the slidable torso section relative to the upright torso-section support and configured to include first and second side locks configured to mate with lock receivers formed in the upright torso-section support to establish the height of the slidable torso section relative to the seat bottom, and (4) a head receiver including a movable headrest that is arranged to move up and down relative to the seat bottom and relative to the slidable torso section and showing that the slidable torso section is retained by the first and second side locks in a lowered position on the torso-section support of the frame to accommodate a relatively shorter child in the child restraint;

FIG. 15 is a view similar to FIG. 14 showing the slidable torso section after the first and second side locks have been unlocked by a caregiver and the slidable torso section has been slid upwardly by the caregiver on the upright torso-section support of the frame to an elevated position on the upright torso-section support so as to lie further away from the seat bottom to expand the size of the child-receiving space to accommodate a relatively taller child in the variable-height shell of the child restraint;

FIG. 16 is an exploded perspective assembly view of illustrative components that cooperate to form the child restraint of FIGS. 14 and 15 and showing that the slidable torso section illustratively comprises an (inverted) U-shaped slidable base (in the background) that is configured to move up and down on the upright torso-section support and a seat back (in the foreground) that has been separated from the U-shaped slidable base; and FIG. 17 is an enlarged perspective view of the frame and showing that the frame includes a seat bottom and an upright torso-section support coupled to a rear edge of the seat bottom, and showing that the upright torso-section support includes a center panel coupled to the rear edge of the seat bottom, a first lock-anchor bracket coupled to a first side of the center panel and configured to be engaged by the first side lock when the first side lock is in the locked position (as shown) in FIGS. 14, 15, 18, 21 and 22 to retain the slidable torso section in one of four stationary positions on the upright torso-section support, and a second lock-anchor bracket coupled to an opposite second side of the center panel and configured to be engaged by the second side lock when the second side lock is in the locked position (as shown in FIGS. 14 and 15) to help retain the slidable torso section in one of the four stationary positions on the upright torso-section support and also showing that the center panel includes three vertical notched strips that are configured to engage a headrest lock included in a headrest-height controller as suggested in FIG. 14 to retain the movable headrest in one of several elevated positions on the upright torso-section support;

FIG. 18 is an enlarged perspective view of components included in the child restraint of FIG. 14 showing that the slidable torso section includes a U-shaped slidable base configured to carry the first and second side locks and move up and down on the upright torso-section support of the frame when the first and second side locks are unlocked and showing that the slidable torso section also includes a seat back that has been separated from the U-shaped slidable base for illustrative purposes and also showing that the first side lock is extended into a lowest of four lock receivers formed in the first lock-anchor bracket of the upright torso-section support to retain the U-shaped slidable base in a first elevated position on the upright torso-section support of the frame and showing that the seat back includes a backrest that will lie in front of and in close proximity to the center panel of the upright torso-section support when the seat back is mounted on the U-shaped slidable base as shown in FIGS. 14 and 15;

FIG. 19 is an exploded perspective assembly view of components comprising the second side lock taken from a front point of view;

FIG. 20 is a view similar to FIG. 19 taken from a rear point of view;

FIG. 21 is a partial perspective view taken along line 21-21 of FIG. 18 showing that the first side locked is locked and the second side lock is unlocked and also showing the three vertical notched strips that are included in the center panel of the upright torso-section support and located between the first and second lock-anchor brackets;

FIG. 22 is an enlarged perspective view of the circled region 22 of FIG. 21 showing portions of the locked first side lock;

FIG. 23 is an enlarged perspective view of the circled region 23 of FIG. 21 showing portions of the unlocked second side lock; and FIG. 24 is an exploded perspective assembly view of illustrative components that cooperate to form the head receiver of FIG. 16.

DETAILED DESCRIPTION

A child restraint 11 is shown in FIGS. 1-3 and comprises a base 10, a reclined frame 12 mounted on base 10, a slidable torso section 14 mounted for up-and-down movement on reclinable frame 12, and a torso-section lock system 60. Frame 12 and slidable torso section 14 cooperate to define a variable-height shell 15 that is formed to include a child-receiving space 15S that can be expanded in size as shown in FIG. 3 or contracted in size as shown in FIG. 1 at the option of a caregiver by moving the slidable torso section 14 upwardly or downwardly relative to the companion reclinable frame 12.

Torso-section lock system 60 is used by a caregiver to lock the slidable torso section 14 to the frame 12 in one of several elevated positions selected by the caregiver to establish the size of variable-height shell 15. Child restraint 11 can be changed to a COMPACT mode by a caregiver in the field so that child restraint 11 can fit on a rear passenger seat RS in a vehicle without bumping into an adjacent forward passenger seat FS when placed in a REARWARD-FACING orientation on rear passenger seat RS as suggested in FIG. 1B.

Figure 4:
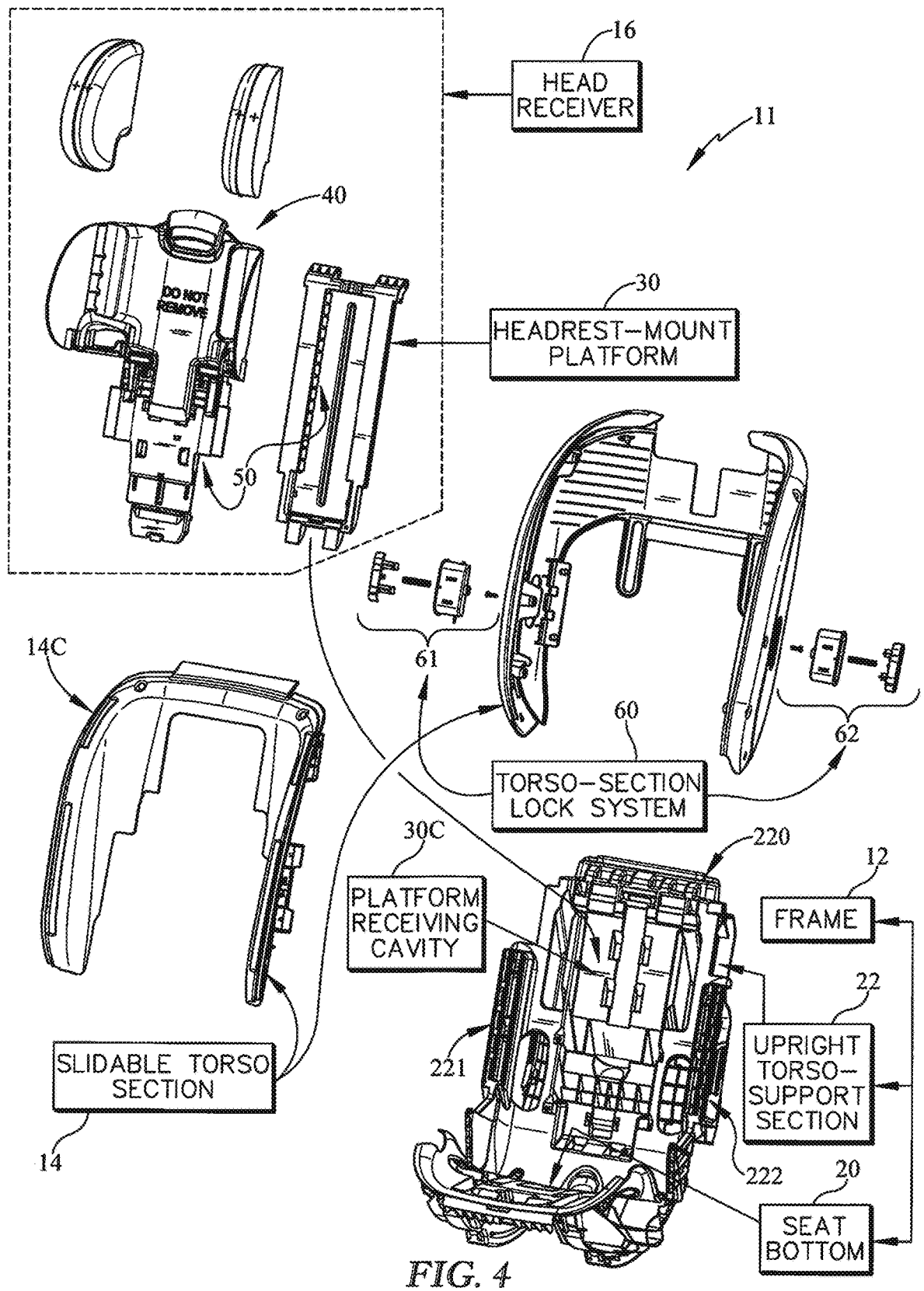

Child restraint 11 further comprises a head receiver 16 that is linked to and associated with frame 12 as suggested diagrammatically in FIGS. 2 and 3 and illustratively in FIG. 4. Up-and-down movement of the slidable torso section 14 on frame 12 does not automatically change the position of head receiver 16 on frame 12. In other words, movement of head receiver 16 relative to frame 12 is not tied directly to movement of the slidable torso section 14 relative to frame 12.

Head receiver 16 includes a movable headrest 40 that is mounted for up-and-down movement on frame 12 relative to slidable torso section 14 and a headrest-height controller 50 that can be used by a caregiver to lock the movable headrest 40 to frame 12 in one of several elevated positions selected by the caregiver to align the movable headrest 40 properly relative to the slidable torso section 14. In use, a caregiver moves slidable torso section 14 upwardly or downwardly on frame 12 to reach a desired elevation above a seat bottom 20 included in frame 12. Then, the caregiver uses headrest-height controller 50 to move headrest 40 to a proper position on frame 12 in relation to torso section 14.

Figure 5:
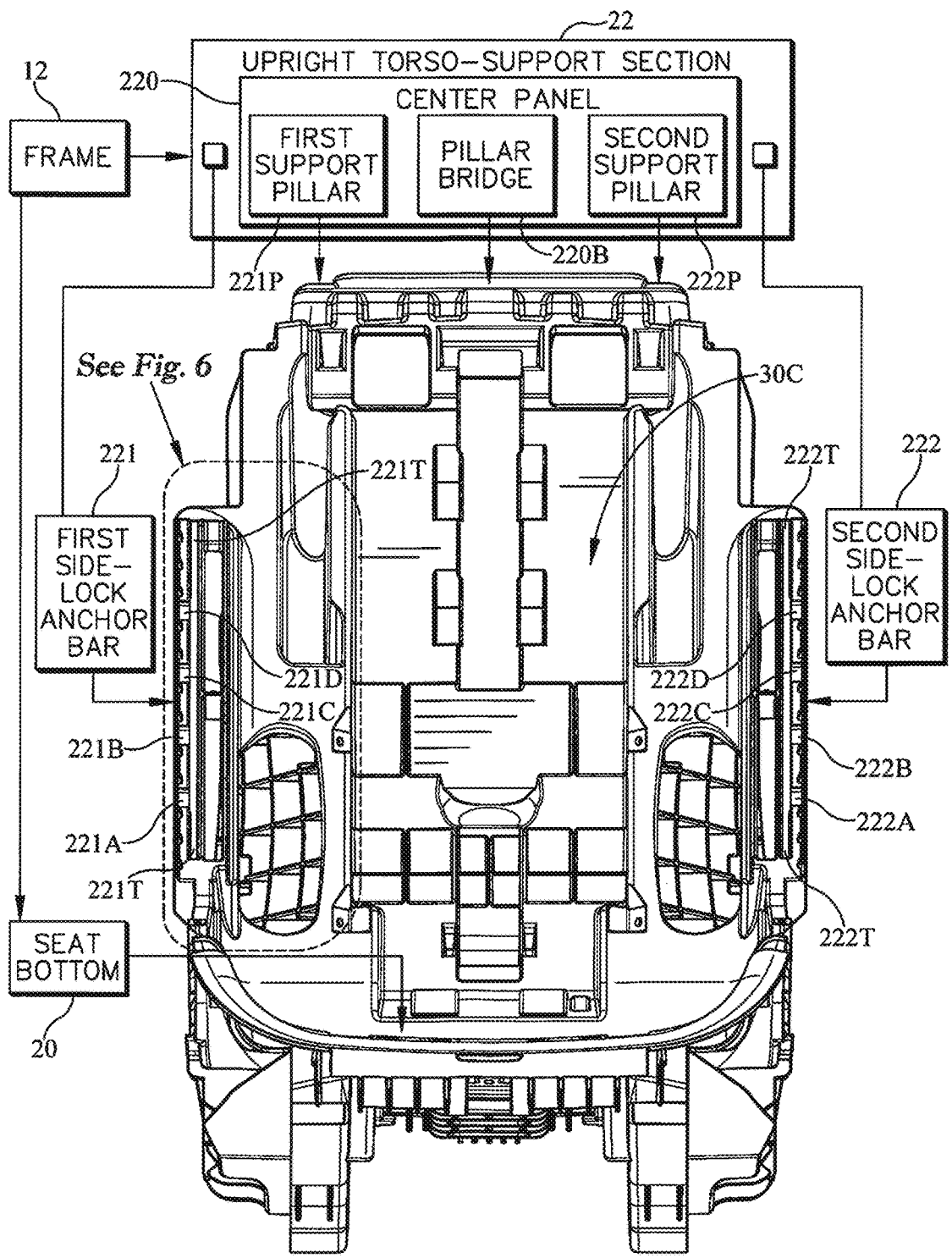

In illustrative embodiments, frame 12 includes a seat bottom 20 and an upright torso-section support 22 comprising first and second support pillars 221P, 222P arranged to extend upwardly from a rear portion of seat bottom 20 as shown, for example, in FIGS. 4 and 5. Slidable torso section 14 is arranged to slide up and down on the first and second support pillars 221P, 222P of upright torso-section support 22 under the control of a caregiver as suggested, for example, in FIGS. 2 and 3.

Upright torso-section support 22 further includes a pillar bridge 220B as suggested in FIG. 5. Pillar bridge 220B lies between and interconnects the first and second support pillars 221P, 222P to form a boundary of a platform-receiving cavity 30C as shown in FIG. 5. Platform-receiving cavity 30C is sized to receive and hold headrest-mount platform 30 of head receiver 16 to coupled head receiver 16 to frame 12 as suggested in FIGS. 2 and 5.

Upright torso-section support section 22 also includes first and second side-lock anchor bars 221, 222. First side-lock anchor bar 221 is coupled to a left outer edge of the first support pillar 221P and configured to mate with a first side lock 61 of the torso-section lock system 60 as suggested in FIGS. 9A and 10. Second side-lock anchor bar 222 is coupled to a right outer edge of the second support pillar 222P and configured to mate with the second side lock 62 of the torso-section lock system 60 as suggested in FIG. 10.

Figure 6:
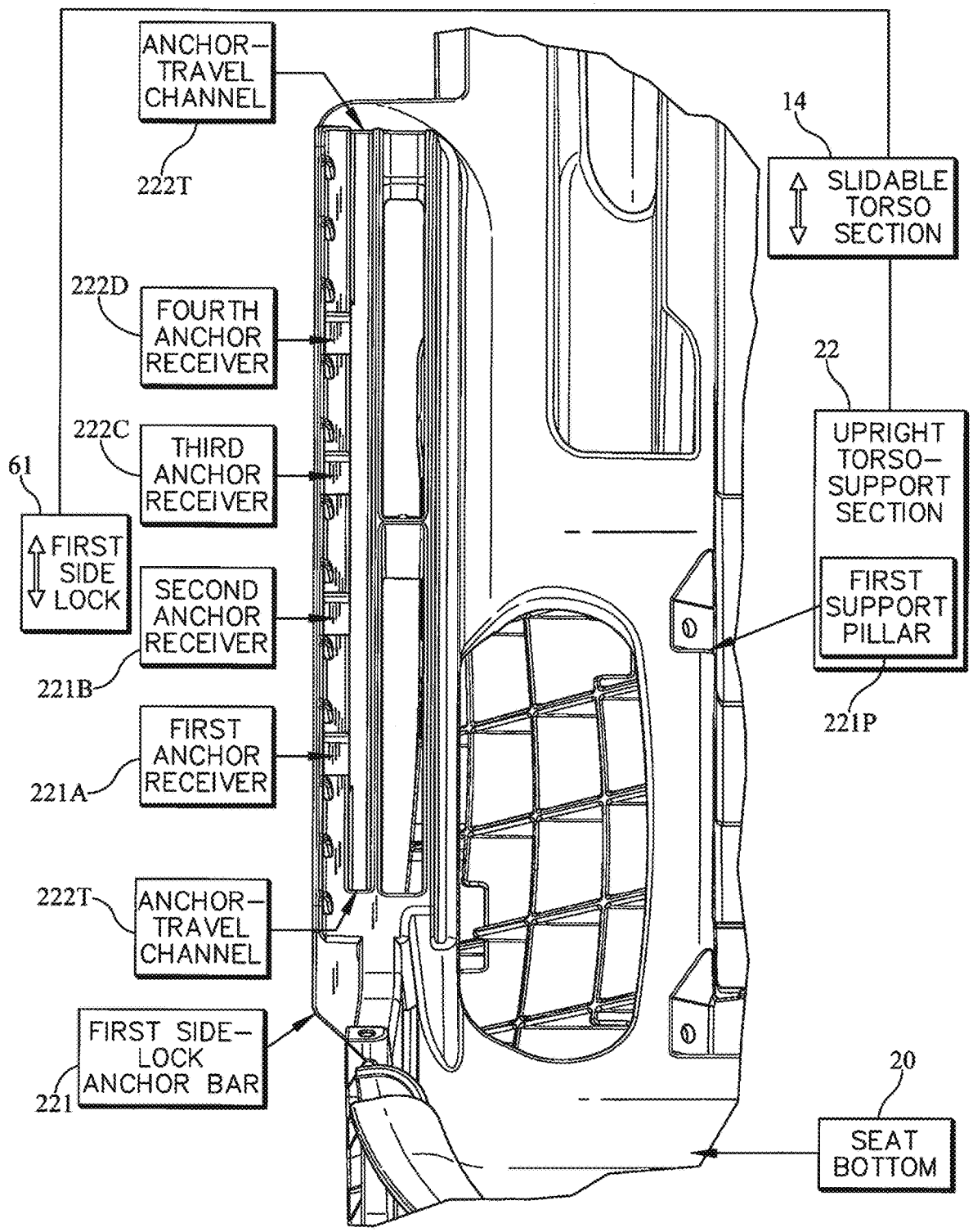
Figure 7:
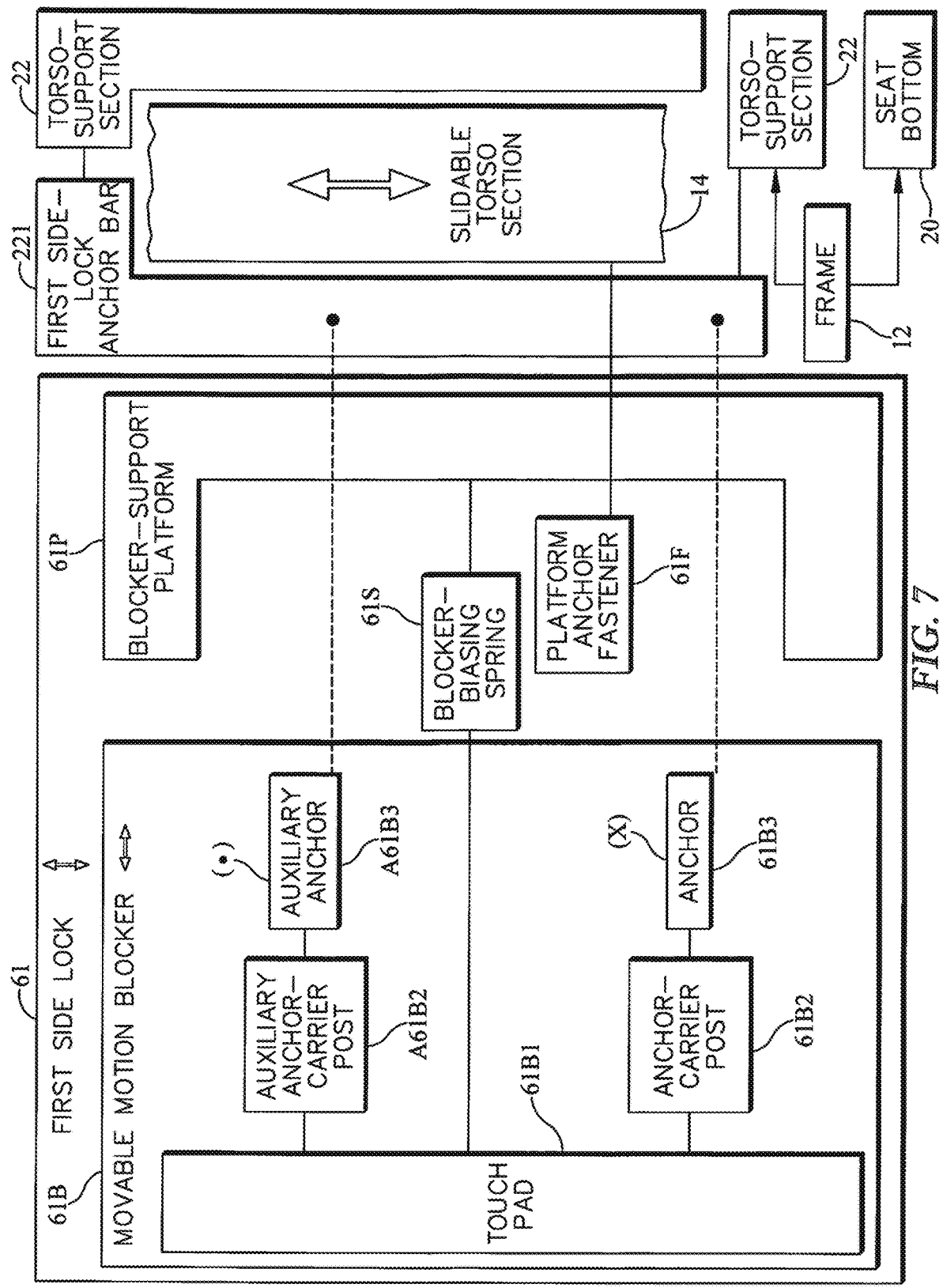
FIG. 7 is a diagrammatic view that is similar to the view shown in FIG. 6 and showing components included in the first side lock and showing the relationship between those components and the first side-lock anchor bar and the slidable torso section.

An enlarged perspective view of a circled region in FIG. 5 is provided in FIG. 6 suggesting diagrammatically that first side lock 61 is coupled to the slidable torso section 14 that is supported for up-and-down movement on the upright torso-support section 22 relative to seat bottom 20 so that first side lock 61 is moved up and down relative to the adjacent first side-lock anchor bar 221 during up-and-down movement of the slidable torso section 14 on frame 12. FIG. 7 is a diagrammatic view that is similar to the view shown in FIG. 6 and showing components included in first side lock 61 and showing the relationship between those components and the first side-lock anchor bar 221 and the slidable torso section 14. An exploded perspective front view of illustrative components included in first side lock 61 is provided in FIG. 8 before they are assembled and mounted on the slidable torso section 22 to move up and down relative to first side-lock anchor bar 221 that is coupled to the upright torso-support section 221 of frame 12.

Torso-section lock system 60 comprises means for releasably locking torso section 14 to the first and second support pillars 221P, 222P of the upright torso-section support 22 of frame 12 to establish the elevation of slidable torso section 14 relative to seat bottom 20 of frame 12. Slidable torso section 14 is retained in a stationary low-elevation LOWERED position on upright torso-section support 22 by torso-section lock system 60 as shown in FIG. 3 to provide a small child-receiving space 15S for accommodating a relatively small child in variable-height shell 15. In contrast, slidable torso section 14 is shown in FIG. 3 after it has been unlocked and moved upwardly on upright torso-section support 22 by a caregiver to assume a higher elevation TOP ELEVATED position and then locked in place to establish a relatively larger child-receiving space 15S.

Torso-section lock system 60 is arranged to move up and down with slidable torso section 14 on upright torso-section support 22 of frame 12 as suggested in FIGS. 2 and 3. Torso-section lock system 60 includes first and second side locks 61, 62 that are each configured to mate with lock receivers 221A-D, 222A-D formed in the upright torso-section support 22 to establish the height of slidable torso section 14 relative to seat bottom 20 of frame 12 as suggested in FIGS. 6 and 9.

Variable-height shell 15 of child restraint 11 can be changed in the field by a caregiver to a COMPACT mode shown in FIG. 1A so that it will fit in a rear passenger seat RS of a vehicle 10 in a REARWARD-FACING orientation without contacting an adjacent front passenger seat FS of vehicle 18 as suggested in FIG. 1B. In COMPACT mode, variable-height shell has an effective length (L) that is relatively short and less than the distance between the seat backs of seats RS and FS as shown in FIG. 1B. dimension 62 is a measure between bottom of shell 15 and top of head receiver 16.

Variable-height shell 15 also can be changed in the field by a caregiver to an EXPANDED mode shown in FIG. 1C so that it can be placed on rear passenger seat RS in a FORWARD-FACING orientation to hold a larger child as shown in FIG. 1D. In the EXPANDED mode, child restraint 11 has a height (H) that is greater than the length (L). Dimension $H_2$ is another measurement of height taken from a point on shell 15.

Variable-height shell 15 in accordance with the present disclosure is shown in FIG. 1A in a COMPACT mode to provide a relatively small child-receiving space 15S. Variable-height shell 15 comprises a stationary base 10 adapted to set on a rear passenger seat RS of a vehicle, a frame 12 mounted for rotational movement on base 10, and a slidable torso section 14 mounted for up-and-down movement on frame 12.

Child restraint 11 of FIG. 1A is sized and shaped to be placed on a rear passenger seat RS in a REARWARD-FACING orientation while the variable-height shell 15 is in the COMPACT mode without contacting the nearby front passenger seat FS. Frame 12 has been rotated on the underlying base 10 about a horizontal axis of rotation 12A by a caregiver to cause frame 12 to recline while the slidable torso section 14 remains in the same LOWERED position on frame 12 shown in FIG. 1A.

Variable-height shell 12 has been reconfigured by a caregiver as shown in FIG. 1C to establish an EXPANDED mode of the variable-height shell 15 in which the height of the variable-height shell 15 has been increased in the field by the caregiver to enlarge the child-receiving space 15S to seat a relatively larger child. The slidable torso section 14 has been moved upwardly on frame 12 to a TOP ELEVATED position and showing that frame 12 has been rotated on the underlying base 10 about its axis of rotation 12A by a caregiver to cause frame 12 to move from the RECLINED position shown in FIG. 1B to the UPRIGHT position shown in FIG. 1C.

A side elevation of a passenger compartment of the vehicle of FIG. 1B is provided in FIG. 1D to show that the child restraint 11 in the EXPANDED mode has been placed on the rear passenger seat RS of the vehicle in a FORWARD-FACING orientation.

Variable-height shell 15 is illustrated in FIG. 2 in the COMPACT mode to show that the slidable torso-section 14 of the variable-height shell 15 has been moved downwardly on an upright torso-section support 22 included in frame 12 and retained in a LOWERED position near a seat bottom 20 also included in frame 12 to contract in size a child-receiving space 15S provided in the variable-height shell 15 to hold an infant or other very small child when the child restraint 11 is placed in a REARWARD-FACING orientation on a rear passenger seat RS in a vehicle as shown in FIG. 1B without causing an upper end of the slidable torso section 14 of the variable-height shell 15 to contact a rearward-facing surface on a companion front passenger seat FS in the vehicle. The variable-height shell 15 also includes a torso-section lock system 60 coupled to the slidable torso section 14 to more therewith relative to frame 12 for locking the slidable torso section 14 in each of several positions on frame 12 under control of a caregiver.

The variable-height shell 15 is illustrated in FIG. 3 in the EXPANDED mode to show that the slidable torso section 14 of the variable-height shell 15 after the first and second side locks 61, 62 of the torso-section lock system 60 have been unlocked by a caregiver and the slidable torso section 14 has been slid upwardly by the caregiver on the frame 12 to a TOP ELEVATED position so as to lie further away from seat bottom 20 of frame 12 to expand the size of the child-receiving space 15S provided in the variable-shape shell 15 to accommodate a relatively taller child when the child restraint 11 is placed in a FORWARD-FACING orientation on a rear passenger seat RS in the vehicle as shown in FIG. 1D.

A series of diagrammatic views is provided in FIGS. 9A-9E to show upward movement of the slidable torso section 14 relative to the upright torso-support section 22 of frame 12 from a LOWERED position near seat bottom 20 as suggested in FIG. 9A when the variable-height shell 15 is in the COMPACT mode as shown in FIGS. 1A and 1B. Slidable torso section 14 is moved first to a FIRST ELEVATED position as suggested in FIG. 9C, and then to a TOP ELEVATED position as suggested in FIG. 9E when the variable-height shell 15 is in the EXPANDED mode as shown in FIGS. 1C and 1D.

Slidable-torso section 14 is shown diagrammatically in a LOWERED position on frame 12 in FIG. 9A. An anchor (X) included in the first side lock 61 extends into a first anchor receiver 221A formed in the first side-lock anchor bar 221 and an auxiliary anchor (●) also included in the first side lock 61 extends into a neighboring second anchor receiver 221B formed in the first side-lock anchor bar 221 to retain the slidable torso section in the LOWERED position on the upright torso-section support 22 of the frame 12.

Slidable torso section 14 is unlocked and lifted to move upwardly on frame 12 as shown diagrammatically in FIG. 9B. The anchor (X) and the auxiliary anchor (●) of the first side lock 61 have exited the first and second anchor receivers 221A, 221B in response to application of a pushing force on a touch pad 61B1 included in the first side lock 61 (see FIG. 7) by a caregiver and begun to move upwardly in an anchor-travel channel 221T formed in the first side-lock anchor bar 221 as the slidable torso section 14 moves upwardly away from seat bottom 20 in response to application of a lifting force F LIFT on the slidable torso section 14 by the caregiver.

Slidable torso section 14 is shown diagrammatically in the FIRST ELEVATED position on frame 12 in FIG. 9C. The first side-lock anchor (X) now extends into the second anchor receiver 221B formed in the first side-lock anchor bar 221 and the first side-lock auxiliary anchor (●) now extends into the neighboring third anchor receiver 221C formed in the first side-lock anchor bar 221 to retain the slidable torso section 14 in the FIRST ELEVATED position on the upright torso-section support 22 of frame 12.

Slidable torso section 14 is unlocked and lifted again to move upwardly on frame 12 toward a TOP ELEVATED position as shown diagrammatically in FIG. 9D. The anchor (X) and the auxiliary anchor (●) have exited the second and third anchor receivers 221B, 221C as the touch pad 61B1 is pushed inwardly again by a caregiver and showing that the anchor (X) and auxiliary anchor (●) have begun to move upwardly in the anchor-travel channel 221T formed in the first side-lock anchor bar 221 as the slidable torso section 14 moves upwardly toward the TOP ELEVATED position shown in FIG. 9E.

Slidable torso section 14 has now arrived at the TOP ELEVATED position as shown diagrammatically in FIG. 9E. The first side-lock anchor (X) now extends into the third anchor receiver 221C formed in the first side-lock anchor bar 221 and the first side-lock auxiliary anchor (●) now extends into the neighboring fourth anchor receiver 221D formed in the first side-lock anchor bar 221 to retain the slidable torso section 14 in the TOP ELEVATED position on the upright torso-section support 22 shown illustratively in FIG. 3.

Child restraint 11 also includes a head receiver 16 comprising a headrest-mount platform 30 that is coupled to frame 12 and a movable headrest 40. Head receiver 16 also includes a headrest-height controller 50 for use by a caregiver to move headrest 40 relative to frame 12 and relative to the slidable torso section 14.

An exploded perspective assembly view of illustrative components that cooperate to form the child restraint 11 of FIGS. 1-3 is provided in FIG. 4 to show that frame 12 comprises a seat bottom 20 and an upright torso-support section 22 arranged to extend upwardly away from a rear edge of seat bottom 20 and formed to include a central platform-receiving cavity 30C for receiving a headrest-mount platform 30 included in head receiver 16 when head receiver 16 is coupled to the upright torso-support section 22 of the frame 12. Frame 12 is a monolithic component made of a plastics material.

Head receiver 16 includes a headrest-mount platform 30 that is retained in a stationary position on upright torso-support section 22 of frame 12, a movable headrest 40 mounted for up-and-down movement relative to headrest mount platform 30, and a headrest-height controller 50 that is coupled to the movable headrest 40 and configured to be operated to control the elevation of the movable headrest 40 relative to slidable torso section 14 and relative to seat bottom 20. Headrest-height controller 50 includes headrest lock means for releasably locking headrest 40 to the headrest-mount platform 30 that is coupled to the upright torso-section support 22 of frame 12 to establish the elevation of headrest 40 relative to the slidable torso section 14 and relative to the seat bottom 20.

Headrest 40 is mounted for up-and-down movement on headrest-mount platform 30 relative to stationary upright torso-section support 22 and also for independent up-and-down movement relative to the slidable torso section 14 regardless of the elevation position of the slidable torso section 14 on the upright torso-section support 22 of frame 12. An illustrative head cradle 42 of headrest 40 is shown in FIGS. 4 and 12 and can be moved up and down relative to the slidable torso section 14 and relative to the torso-section support 22 independent of sliding movement of slidable torso section 14 relative to the upright torso-section support 22 of frame 12 so that head cradle 42 of headrest 40 can be positioned a proper location on torso-section support 22 to support the head of shorter and relatively taller children seated on seat bottom 20.

Upright torso-section support 22 of frame 12 includes a center panel 220, a first side-lock anchor bar 221, and a second side-lock anchor bar 222 as shown, for example, in FIGS. 3, 4, and 5. Center panel 220 is coupled to rear edge 20R of the stationary seat bottom 20 and arranged to extend upwardly away from seat bottom 20 as shown in FIGS. 4 and 5. First side-lock anchor bar 221 is coupled to a first side of center panel 220 and located midway between top and bottom ends of center panel 220 as shown, for example, in FIG. 4. Second side-lock anchor bar 222 is coupled to an opposite second side of center panel 220 and is arranged to lie in laterally spaced-apart relation to the opposing first side-lock-anchor bar 221 as show, for example, in FIG. 5.

First side-lock anchor bar 221 is coupled to a first perimeter side segment of center panel 220 such as first support pillar 221P and arranged to extend outwardly to lie above seat bottom 20 as suggested in FIGS. 5 and 6. In an illustrative embodiment, first side-lock anchor bar 221 is cantilevered to first perimeter side segment 221P of center panel 220.

First side-lock anchor bar 221 is formed to include a series of four vertically spaced-apart lock receivers 221A-D as shown, for example, in FIG. 4. Each adjacent pair of lock receivers 221A-D corresponds with one of the three elevated positions of the slidable torso section 14 on the upright torso-section support 22. First side lock 61 of torso-section lock system 60 is configured to engage lock receiver pairs (221A, 221B) or (221B, 221C) or (221C, 221D) formed in first side-lock anchor bar 221 selected by a caregiver to establish the elevation of the slidable torso section 14 on the upright torso-section support 22 above seat bottom 20 and relative to movable headrest 40.

Second side-lock anchor bar 222 is coupled to a second perimeter side segment such as second support pillar 222P of center panel 220 and arranged to extend outwardly (away from first side-lock anchor bar 221) to lie above seat bottom 20 as suggested in FIGS. 4 and 7. In an illustrative embodiment, second side-lock anchor bar 222 is cantilevered to second perimeter side segment 222P. Second perimeter side segment 222P is arranged to lie in laterally spaced-apart relation to first perimeter side segment 221P as shown in FIG. 5.

Second side-lock anchor bar 222 is formed to include a series of four vertically spaced apart lock receivers 222A-D as shown, for example, in FIG. 4. Each adjacent pair of lock receivers 222A-D corresponds with one of the three elevated position of the slidable torso section 14 on the upright torso-section support 22. Second side lock 62 of torso-section lock system 60 is configured to engage 222A, 222B, 222C, or 222D formed in second side-lock anchor bar 222 lock receiver pairs (222A, 222B) or (222B, 222C) or (222C, 222D) selected by a caregiver to establish the elevation of the slidable torso section 14 on the upright torso-section support 22 of frame 12 above seat bottom 20 and relative to movable headrest 40.

Slidable torso section 14 includes a laterally extending center wing support 140, a downwardly extending first side wing 141 coupled to a first end of center wing support 140, and a downwardly extending second side wing 142 coupled to an opposite second end of center wing support 140 and arranged to lie in laterally spaced-apart relation to first side wing 141 as shown, for example, in FIG. 3. First side lock 61 is coupled to first side wing 141 to move therewith during up-and-down movement of slidable torso section 14 on upright torso-section support 22 of frame 12. Second side lock 62 is coupled to second side wing 142 to move therewith during up-and-down movement of slidable torso section 14 on upright torso-section support 22 of frame 12.

A caregiver can access and operate first side lock 61 through a first lock-access aperture formed in an outwardly facing exterior surface of first side wing 141 of slidable torso section 14 as suggested in FIG. 1A. A caregiver can access and operate second side lock 62 through a second lock-access aperture 62A formed in an outwardly facing exterior surface of second side wing 142 as shown in FIG. 1B.

Figure 8A:
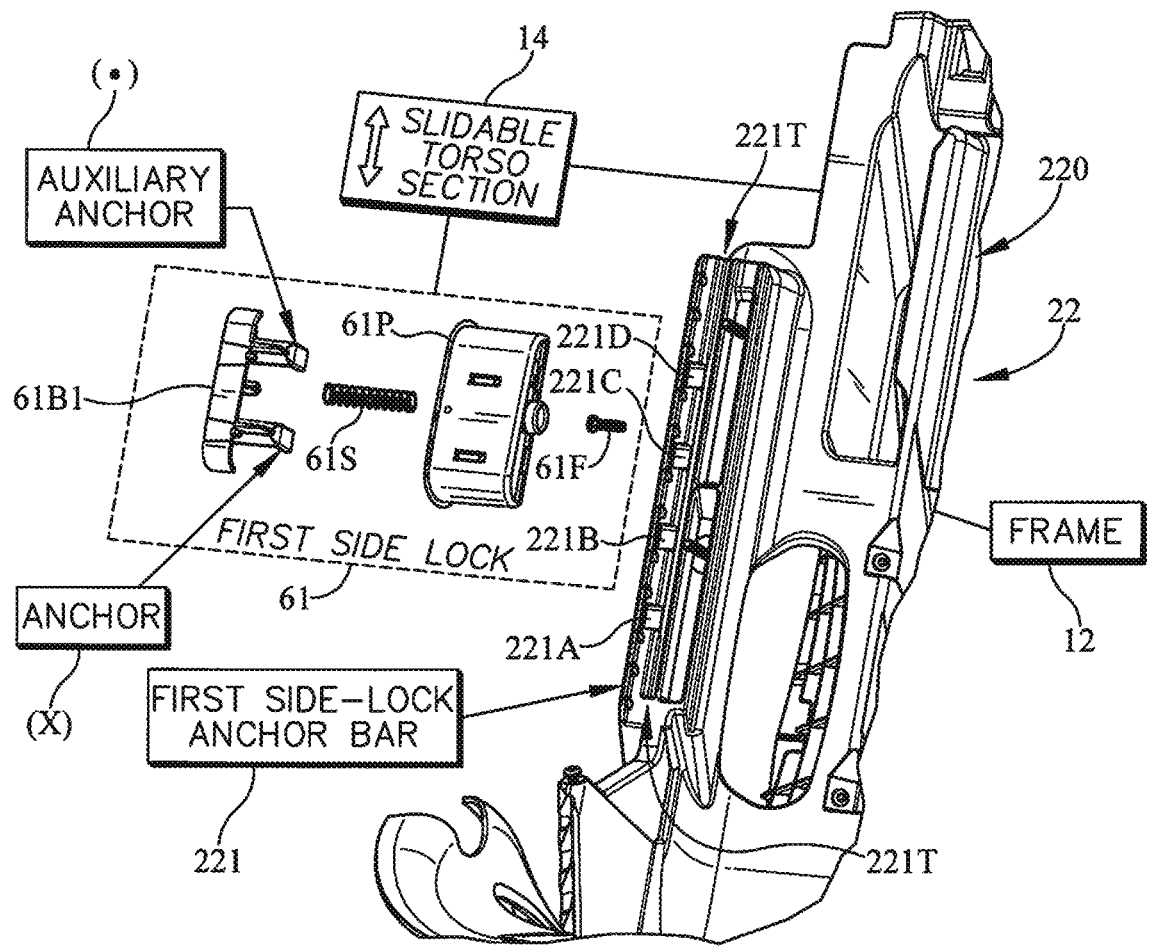
FIG. 8A is an exploded perspective front view of illustrative components included in the first side lock before they are assembled and mounted on the slidable torso section to move up and down relative to the first side-lock anchor bar that is coupled to the upright torso-support section of the frame.
Figure 8B:
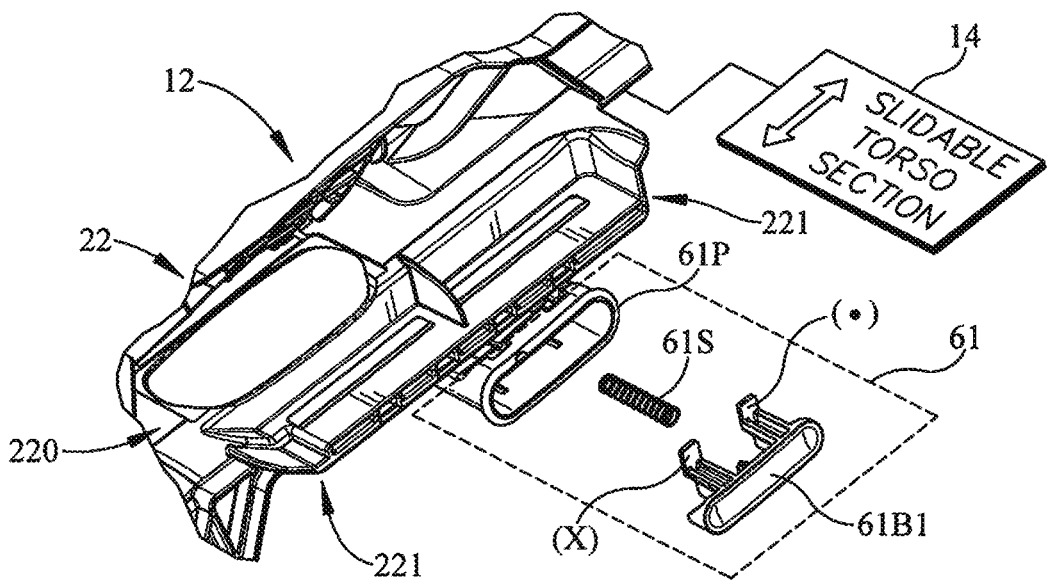
FIG. 8B is a view similar to FIG. 8A taken from a rear point of view.

First side lock 161 includes a blocker-support platform 61P, a movable motion blocker 61B, a blocker-biasing spring 61S, and two platform-anchor fasteners 61F as shown, for example, in FIGS. 7, 8A, and 8B. Blocker-support platform 61P is mounted using fasteners 61F in a stationary position on a first side of slidable torso section 14 in alignment with the first lock-access aperture 61A. Motion blocker 61B is mounted for reciprocal movement in a blocker-receiving cavity 61C formed in blocker-support platform 61P. Motion blocker 61B includes a touch pad 61B1 exposed to view in the first lock-access aperture 61A so that it can be pushed by a caregiver to unlock the normally locked first side lock 61. Motion blocker 61B also includes an anchor 61B3 configured to fit into one of the anchor slots formed in first lock-anchor bracket 221. Motion blocker 61B also includes an anchor-carrier post 61B2 arranged to interconnect touch pad 61B1 and anchor (X). Blocker-biasing spring 61S acts between blocker-support platform 61P and the underside of touch pad 61B1 normally to yieldably bias anchor (X) to extend into one of the anchor slots formed in first lock-anchor bracket 221 so that up-and-down motion of slidable torso section 14 relative to the upright torso-section support 22 of frame 12 is blocked. To free slidable torso section 14 for up-and-down movement on the upright torso-section support 14 to expand or contract the size of child-receiving space 15S in variable-height shell 15, a caregiver need only apply a pushing force to an exposed portion of touch pad 61B1 to compress spring 61S and cause anchor (X) to exit the anchor slot so that motion of slidable torso section 14 relative to the upright torso-section support 22 is blocked no longer.

Second side lock 62 includes a blocker-support platform 62P, a movable motion blocker 62B, a blocker-biasing spring 62S, and two platform-anchor fasteners 62F as shown, for example, in FIG. 4. Blocker-support platform 62P is mounted using fasteners 62F in a stationary position on a second side of slidable torso section 14 in alignment with the second lock-access aperture 62A. Motion blocker 62B is mounted for reciprocal movement in a blocker-receiving cavity 62C formed in blocker-support platform 62P. Motion blocker 62B includes a touch pad 62B1 exposed to view in the second lock-access aperture 62A so that it can be pushed by a caregiver to unlock the normally locked second side lock 62. Motion blocker 62B also includes an anchor (X) configured to fit into one of the anchor slots formed in second lock-anchor bracket 221. Motion blocker 62B also includes an anchor-carrier post 62B2 arranged to interconnect touch pad 62B1 and anchor (X). Blocker-biasing spring 62S acts between blocker-support platform 62P and the underside of touch pad 62B1 normally to yieldably bias anchor (X) to extend into one of the anchor slots 221S1-S4 (see FIG. 4) formed in second side-lock anchor bar 221 so that up-and-down motion of slidable torso section 14 relative to the upright torso-section support 22 of frame 12 is blocked. To free slidable torso section 14 for up-and-down movement on the upright torso-section support 14 to expand or contract the size of child-receiving space 15S in variable-height shell 15, a caregiver need only apply a pushing force to an exposed portion of touch pad 62B1 to compress spring 62S and cause anchor (X) to exit the anchor slot so that motion of slidable torso section 14 relative to the upright torso-section support 22 is blocked no longer.

Slidable torso section 14 can be moved upwardly away from seat bottom 20 by a caregiver after the first and second side locks 61, 62 has been moved to disengage the companion lock receivers formed in first and second side-lock anchor bar 221, 222 so that a taller child can be seated on seat bottom 20. Headrest 40 can be moved upwardly away from seat bottom 20 to change the elevation of movable headrest 40, and, in some cases, to allow for upward sliding movement of slidable torso section 14 relative to frame 20 by operating headrest-height controller 50. The position of headrest 40 relative to torso section 14 can be adjusted up or down by the caregiver using headrest-height controller 50 so that it remains in a stationary position on frame 12.

In the present disclosure, seat bottom 20 is provided on frame 12 and torso-section support 22 extends upwardly behind the seating surface provided by seat bottom 20 as suggested in FIGS. 3 and 4. Movable headrest 40 and headrest-height controller 50 of headrest 16 are mounted upright to torso-section support 22 and will have clearance to torso section 14 so that headrest 16 can move semi-independently of torso section 14. To help define the fitment to the child to be seated on seat bottom 20, head receiver 40 will move to a certain point relative to upright torso-section support 22 and then slidable torso section 14 will be required to move in the same direction relative to upright torso-section support 22 if headrest 40 of head receiver 16 is to move further in that same direction relative to upright torso-section support 22.

In the present disclosure, torso section 14 is able to move upwardly relative to seat bottom 20 to provide additional protection and enhanced sizing for a taller child seated on seat bottom 20. In addition, when torso section 14 moves upwardly it will expose the belt path for COMPACT (BOOSTER) mode as suggested in FIG. 2. When torso section 14 is in a retracted or lowest position as shown in FIG. 1, the booster belt path is covered to help minimize confusion by a caregiver during installation of child restraint 11 in a vehicle.

In the present disclosure, adjustment of the elevation of torso section 14 and headrest 40 of head receiver 16 relative to seat bottom 20 and relative to one another promotes prolonged use of child restraint 11 as the child grows taller by allowing for proper fitment of differently sized children. Head receiver 16 can move independently or also couple to the child-restraint harness to adjust the height. For belt positioning mode, the belt path is exposed at all times in illustrative embodiments. The present disclosure allows the torso section 14 to move independently of headrest 40 of head receiver 16 relative to seat bottom 20 to give an additional component that can be adjusted to fit the child better. The belt path for belt positioning booster made is hidden until the child is large enough for child restraint 11 to be expanded by raising torso section 14 thereby exposing the belt path.

A child restraint 111 in accordance with another embodiment of the present disclosure is shown in FIGS. 14-16 and comprises a frame 112, a slidable torso section 114 mounted for up-and-down movement on frame 112, and a torso-section lock system 160. Frame 112, slidable torso section 114, and torso-section lock system 160 cooperate to define a variable-height shell 115 that is formed to include a child-receiving space 115S that can be expanded in size as shown in FIG. 15 or contracted in size as shown in FIG. 14 at the option of a caregiver by moving the slidable torso section 114 upwardly or downwardly relative to the companion frame 112. Torso-section lock system 160 is used by a caregiver to lock the slidable torso section 114 to the frame 112 in one of several elevated positions selected by the caregiver to establish the size of variable-height shell 115.

Child restraint 111 further comprises a head receiver 116 that is associated with frame 112 as suggested diagrammatically in FIGS. 14 and 15 and illustratively in FIG. 24. Head receiver 116 includes a movable headrest 140 that is mounted for up-and-down movement on frame 112 and a headrest-height controller 150 that can be used by a caregiver to lock the movable headrest 140 in one of several elevated positions selected by the caregiver to align the movable headrest 140 properly relative to the slidable torso section 114.

In illustrative embodiments, frame 112 includes a seat bottom 120 and an upright torso-section support 122 arranged to extend upwardly from a rear portion of seat bottom 120 as shown, for example, in FIGS. 16-18. Slidable torso section 114 is arranged to slide up and down on upright torso-section support 122 under the control of a caregiver as suggested, for example, in FIGS. 14 and 15.

Torso-section lock system 160 comprises means for releasably locking torso section 114 to the upright torso-section support 122 of frame 112 to establish the elevation of slidable torso section 114 relative to seat bottom 120 of frame 112. Slidable torso section 114 is retained in a stationary low-elevation position on upright torso-section support 122 by torso-section lock system 160 as shown in FIG. 14 to provide a small child-receiving space 115S for accommodating a relatively small child in variable-height shell 115. In contrast, slidable torso section 114 is shown in FIG. 15 after it has been unlocked and moved upwardly on upright torso-section support 122 by a caregiver to assume a higher elevation and then locked in place to establish a relatively larger child-receiving space 115S.

Torso-section lock system 160 is arranged to move up and down with slidable torso section 114 on upright torso-section support 122 of frame 112 as suggested in FIGS. 14 and 15. Torso-section lock system 160 includes first and second side locks 161, 162 that are each configured to mate with lock receivers formed in the upright torso-section support 122 to establish the height of slidable torso section 114 relative to seat bottom 120 of the frame 112 as suggested in FIGS. 18 and 21.

Head receiver 116 includes a movable headrest 140 and a headrest-height controller 150 that is coupled to the movable headrest 140 to move up and down therewith relative to slidable torso section 114 and to seat bottom 120 of frame 112. Headrest-height controller 150 includes headrest lock means for releasably locking headrest 140 to the upright torso-section support 122 of frame 112 to establish the elevation of headrest 140 relative to slidable torso section 114 and to seat bottom 120 of frame 112.

Headrest 140 is mounted for up-and-down movement relative to stationary upright torso-section support 122 and also for independent up-and-down movement relative to the slidable torso section 114. An illustrative head cradle 142 of headrest 140 is shown in FIGS. 16 and 24 and can be moved up and down relative to the slidable torso section 114 and relative to the torso-section support 122 independent of sliding movement of slidable torso section 114 relative to the upright torso-section support 122 of frame 112 so that head cradle 142 of headrest 140 can be positioned a proper location on torso-section support 122 to support the head of shorter and relatively taller children seated on seat bottom 120.

Upright torso-section support 122 of frame 112 includes a center panel 1220, a first side-lock anchor bar 1221, and a second side-lock anchor bar 1222 as shown, for example, in FIGS. 16, 17, and 21. Center panel 1220 is coupled to rear edge 120R of the stationary seat bottom 120 and arranged to extend upwardly away from seat bottom 120 as shown in FIG. 17. First side-lock anchor bar 1221 is coupled to a first side of center panel 1220 and located midway between top and bottom ends of center panel 1220 as shown, for example, in FIG. 17. Second side-lock anchor bar 1222 is coupled to an opposite second side of center panel 1220 and is arranged to lie in laterally spaced-apart relation to the opposing first side-lock anchor bar 1221 as shown, for example, in FIG. 17.

Center panel 1220 of upright torso-section support 122 includes a plate 1220P and three notched strips 1220S1, 1220S2, and 1220S3 coupled to plate 1220P as shown, for example, in FIGS. 17-21. Strips 1220S1-S3 are arranged to interconnect top and bottom ends of plate 1220P and lie in laterally spaced-apart relation to one another as shown in FIG. 17. Strips 1220S1-S3 are notched so that the notches (N) open in rearward directions away from the back of a child seated on seat bottom 120 of frame 112 as suggested in FIGS. 18-21. Each horizontal row of notches (N) corresponds with a specific elevated position of the movable headrest 140 on the upright torso-section support 122. Headrest-height controller 150 is configured to engage a notch (N) formed in each of strips 1220S1-S3 selected by a caregiver to establish the elevation of the movable headrest 140 on the upright torso-section support 122 above seat bottom 120 and relative to the slidable torso section 114.

First side-lock anchor bar 1221 is coupled to a first perimeter side segment 1220A of center panel 1220 and arranged to extend forwardly and outwardly to lie above seat bottom 120 as suggested in FIGS. 18 and 19. In an illustrative embodiment, first side-lock anchor bar 1221 is cantilevered to first perimeter side segment 1220A of center panel 1220 and inclined to form an obtuse angle 110 of about 110 degrees therebetween as shown in FIG. 17.

First side-lock anchor bar 1221 is formed to include a series of four vertically spaced-apart lock receivers 1221A-D as shown, for example, in FIG. 17. Each lock receiver 1221A-D corresponds with a specific elevated position of the slidable torso section 114 on the upright torso-section support 122 of frame 112. First side lock 161 of torso-section lock system 160 is configured to engage a lock receiver 1221A, 1221B, 1221C, or 1221D formed in first side-lock anchor bar 1221 selected by a caregiver to establish the elevation of the slidable torso section 114 on the upright torso-section support 122 above seat bottom 120 and relative to movable headrest 140.

Second side-lock anchor bar 1222 is coupled to a second perimeter side segment 1220B of center panel 1220 and arranged to extend forwardly and outwardly (away from first side-lock anchor bar 1221) to lie above seat bottom 120 as suggested in FIGS. 17 and 20. In an illustrative embodiment, second side-lock anchor bar 1222 is cantilevered to second perimeter side segment 1220 and inclined to form an obtuse angle of about 110 degrees therebetween as shown in FIG. 21. Second perimeter side segment 1220B is arranged to lie in laterally spaced-apart relation to first perimeter side segment 1220A as shown in FIG. 17 to locate strips 1220S1-S3 therebetween. First perimeter side segment 1220A and first strip 1220S1 cooperate to form a first narrow vertical space N1 therebetween as shown in FIG. 17. First and second strips 1220S1, S2 cooperate to form a first wide vertical space W1 therebetween. Second and third strips 1220S2, S3 cooperate to form a second wide vertical space W2 therebetween. Third strip 1220S3 and second perimeter side segment 1220B cooperate to form a second narrow vertical space N2 therebetween.

Second side-lock anchor bar 1222 is formed to include a series of four vertically spaced apart lock receivers 1222A-D as shown, for example, in FIG. 17. Each lock receiver 1222A-D corresponds with a specific elevated position of the slidable torso section 114 on the upright torso-section support 122 and with one and only one of lock receivers 1221A-D formed in the laterally spaced-apart companion first side-lock anchor bar 1221. Second side lock 162 of torso-section lock system 160 is configured to engage a lock receiver 1222A, 1222B, 1222C, or 1222D formed in second side-lock anchor bar 1222 selected by a caregiver to establish the elevation of the slidable torso section 114 on the upright torso-section support 122 of frame 112 above seat bottom 120 and relative to movable headrest 140.

Slidable torso section 114 includes a slidable (inverted) U-shaped foundation 114F and a separate seat back 114B in an illustrative embodiment as shown in FIGS. 14, 16, and 18. Foundation 114F is configured to move up and down on the upright torso-section support 122. Seat back 114B normally is mounted on the slidable U-shaped foundation 114F to move up and down therewith relative to the upright torso-section support 122. Seat back 114B can be separated from foundation 114F as shown, for example, in FIG. 18.

Foundation 114F of slidable torso section 114 includes a laterally extending center wing support 114F0, a downwardly extending first side wing 114F1 coupled to a first end of center wing support 114F0, and a downwardly extending second side wing 114F2 coupled to an opposite second end of center wing support 114F0 and arranged to lie in laterally spaced-apart relation to first side wing 114F1 as shown, for example, in FIGS. 16 and 18. First side lock 161 is coupled to first side wing 114F1 to move therewith during up-and-down movement of foundation 114F of slidable torso section 114 on upright torso-section support 122 of frame 112. Second side lock 162 is coupled to second side wing 114F2 to move therewith during up-and-down movement of foundation 114F on upright torso-section support 122 of frame 112.

Seat back 114B of slidable torso section 114 includes a backrest 114B0, a first side-wing cover 114B1, and a second side-wing cover 114B2 as suggested in FIGS. 16 and 18. First side-wing cover 114B1 is coupled to one side of backrest 114B0 and arranged to cover first side wing 114F1, first side lock 161, and first side-lock anchor bar 1221 as suggested in FIGS. 10 and 21. A caregiver can access and operate first side lock 161 through a first lock-access aperture 161A formed in an outwardly facing exterior surface of first side-wing cover 114B1 as suggested in FIG. 18. Second side-wing cover 114B2 is coupled to an opposite side of backrest 114B0 and arranged to cover second side wing 114F2, second side lock 162, and second side-lock anchor bar 1222 as suggested in FIGS. 18 and 21. A caregiver can access and operate second side lock 162 through a second lock-access aperture 162A formed in an outwardly facing exterior surface of second side-wing cover 114B2 as shown in FIG. 18.

First side lock 161 includes a blocker-support platform 161P, a movable motion blocker 161B, a blocker-biasing spring 161S, and two platform-anchor fasteners 161F as shown, for example, in FIGS. 16 and 21. Blocker-support platform 161P is mounted using fasteners 161F in a stationary position on a first side of slidable torso section 114 in alignment with the first lock-access aperture 161A. Motion blocker 161B is mounted for reciprocal movement in a blocker-receiving cavity 161C formed in blocker-support platform 161P. Motion blocker 161B includes a touch pad 161B1 exposed to view in the first lock-access aperture 161A so that it can be pushed by a caregiver to unlock the normally locked first side lock 161. Motion blocker 161B also includes an anchor 161B3 configured to fit into one of the four anchor slots formed in first side-lock anchor bar 1221. Motion blocker 161B also includes an anchor-carrier post 161B2 arranged to interconnect touch pad 161B1 and anchor 161B3. Blocker-biasing spring 161S acts between blocker-support platform 161P and the underside of touch pad 161B1 normally to yieldably bias anchor 161B3 to extend into one of the anchor slots formed in first lock-anchor bracket 1221 so that up-and-down motion of slidable torso section 114 relative to the upright torso-section support 122 of frame 112 is blocked. To free slidable torso section 114 for up-and-down movement on the upright torso-section support 114 to expand or contract the size of child-receiving space 115S in variable-height shell 115, a caregiver need only apply a pushing force to an exposed portion of touch pad 161B1 to compress spring 161S and cause anchor 161B3 to exit the anchor slot so that motion of slidable torso section 114 relative to the upright torso-section support 122 is blocked no longer.

Second side lock 162 includes a blocker-support platform 162P, a movable motion blocker 162B, a blocker-biasing spring 162S, and two platform-anchor fasteners 162F as shown, for example, in FIGS. 16 and 21. Blocker-support platform 162P is mounted using fasteners 162F in a stationary position on a second side of slidable torso section 114 in alignment with the second lock-access aperture 162A. Motion blocker 62B is mounted for reciprocal movement in a blocker-receiving cavity 162C formed in blocker-support platform 162P. Motion blocker 162B includes a touch pad 162B1 exposed to view in the second lock-access aperture 162A so that it can be pushed by a caregiver to unlock the normally locked second side lock 162. Motion blocker 162B also includes an anchor 162B3 configured to fit into one of the four anchor slots formed in second side-lock anchor bar 1221. Motion blocker 162B also includes an anchor-carrier post 162B2 arranged to interconnect touch pad 162B1 and anchor 162B3. Blocker-biasing spring 162S acts between blocker-support platform 162P and the underside of touch pad 162B1 normally to yieldably bias anchor 162B3 to extend into one of the anchor slots 1221S1-S4 (see FIG. 17) formed in second side-lock anchor bar 1221 so that up-and-down motion of slidable torso section 114 relative to the upright torso-section support 122 of frame 112 is blocked. To free slidable torso section 114 for up-and-down movement on the upright torso-section support 114 to expand or contract the size of child-receiving space 115S in variable-height shell 115, a caregiver need only apply a pushing force to an exposed portion of touch pad 162B1 to compress spring 162S and cause anchor 162B3 to exit the anchor slot so that motion of slidable torso section 114 relative to the upright torso-section support 122 is blocked no longer.

Slidable torso section 114 can be moved upwardly away from seat bottom 120 by a caregiver after the first and second side locks 161, 162 has been moved to disengage the companion lock receivers formed in first and second side-lock anchor bar 1221, 1222 so that a taller child can be seated on seat bottom 120. Head cradle 142 of headrest 40 can be moved upwardly away from seat bottom 120 to change the elevation of movable headrest 140, and, in some cases, to allow for upward sliding movement of slidable torso section 114 relative to frame 120 by operating headrest-height controller 150. The position of head cradle 142 relative to torso section 114 can be adjusted up or down by the caregiver using headrest-height controller 150 so that it remains in a stationary position on frame 112.

In the present disclosure, seat bottom 120 is provided on frame 112 and torso-section support 122 extends upwardly behind the seating surface provided by seat bottom 120 as suggested in FIGS. 16 and 17. Movable headrest 140 and headrest-height controller 150 of headrest 116 are mounted upright to torso-section support 122 and will have clearance to torso section 114 so that headrest 16 can move semi-independently of torso section 114. To help define the fitment to the child to be seated on seat bottom 120, head receiver 140 will move to a certain point relative to upright torso-section support 122 and then slidable torso section 114 will be required to move in the same direction relative to upright torso-section support 122 if head receiver 116 is to move further in that same direction relative to upright torso-section support 122.

Torso section 114 is also mounted for up-and-down sliding movement on torso-section support 122 of frame 112 as suggested in FIGS. 14 and 15. Torso section 114 will be adjustable upward by a lock mechanism 160 comprising side locks 161, 162 that locks torso section 114 to upright torso-section support 122 of frame 112. First side wing lock 161 includes a blocker-support platform 161P that mounts in an aperture 161A formed in first side wing 114F1 to help retain a movable motion blocker 161B, which will be biased into a locking position by a spring 161S as suggested in FIG. 16. The locking positions will be an interaction between movable motion blocker 161B and companion anchor-slot-defining tabs on the side of frame 112.

In the present disclosure, torso section 114 is able to move upwardly relative to seat bottom 120 to provide additional protection and enhanced sizing for a taller child seated on seat bottom 120. In addition, when torso section 114 moves upwardly it will expose the belt path for booster mode as suggested in FIG. 15. When torso section 114 is in a retracted or lowest position as shown in FIG. 14, the booster belt path is covered to help minimize confusion by a caregiver during installation of child restraint 111 in a vehicle.

Headrest 140 includes (in an illustrative embodiment) a movable head cradle 142 and a cradle retainer 144 as shown, for example, in FIG. 24. Head cradle 142 is configured to support the head of a child (not shown) seated on seat bottom 120. Cradle retainer 144 is coupled to head cradle 142 and arranged to slide on the upright torso-section support 122 of frame 112 during up-and-down movement of headrest 140 relative to the stationary torso-section support 122 and relative to the slidable torso section 114. Cradle retainer 144 is arranged to extend from the movable head cradle 142 through a retainer-receiver aperture 144A formed in the slidable torso section 114 as suggested in FIG. 24 to engage the torso-section support 122 of frame 112 so that head cradle 142 of headrest 140 can be moved by a caregiver relative to frame 112 and relative to the slidable torso section 114.

Head receiver 116 also includes a headrest-height controller 150 that is coupled to headrest 140 to move up and down therewith relative to the torso-section support 122 of frame 112 and relative to the slidable torso section 114 as suggested in FIG. 24. Headrest-height controller 150 includes a headrest lock 152 that is configured to engage a lock receiver 1220S1-S3 formed in the torso-section support 122 of frame 112 to establish the height of headrest 140 relative to seat bottom 120 of frame 112. Headrest-height controller 150 also includes a headrest-lock release 154 that is configured to be gripped by a caregiver and is coupled to the movable head cradle 142 to move up and down therewith relative to the torso-section support 122 of frame 112.

Headrest-lock release 154 is configured to interact with the headrest lock 152 when gripped and moved by a caregiver to cause headrest lock 152 to disengage the lock receiver 1220S1-S3 formed in the torso-section support 122 of frame 112 to free headrest 40 to be moved up and down on the torso-section support 122 relative to the torso-section support 122 and to the slidable torso section 114 by the caregiver to establish a selected height of headrest 140 relative to seat bottom 120 of frame 112 and to the slidable torso section 114.

In the present disclosure, adjustment of the elevation of torso section 114 and head receiver 116 relative to seat bottom 120 and relative to one another promotes prolonged use of child restraint 111 as the child grows taller by allowing for proper fitment of differently sized children. Head receiver 116 can move independently or also couple to the child-restraint harness to adjust the height. For belt positioning mode, the belt path is exposed at all times in illustrative embodiments. The present disclosure allows the torso section 114 to move independently of head receiver 116 relative to seat bottom 120 to give an additional component that can be adjusted to fit the child better. The belt path for belt positioning booster made is hidden until the child is large enough for child restraint 111 to be expanded by raising torso section 114 thereby exposing the belt path.

A caregiver can operate headrest-height controller 150 to lock headrest 140 to the upright torso-section support 122 in a selected elevated position above seat bottom 120 or unlock headrest 140 to disengage the upright torso-section support 122 so that headrest 140 can be moved up and down on torso-section support 122 relative to torso section 114 to a new selected elevation position. Headrest lock 152 includes a headrest-retainer rod 173 in an illustrative embodiment as suggested in FIG. 24. Lock receiver of seat-support back 122 comprises several rearwardly extending notched strips 1220S1-S3 that are formed to include rod-receiving notches N as suggested in FIGS. 14-17. Each rod-receiving notch N is sized to receive headrest-retainer rod 173 therein to lock headrest 140 to seat-support back 122 of frame 112. Headrest-lock release 154 includes push handle 178 and release lever 176 as suggested in FIG. 24. Release lever 176 is mounted on actuator support 179 for pivotable movement about pivot axis 171A and is coupled to headrest-retainer rod 173. In use, a caregiver can pivot release lever 176 about pivot axis 171A to cause headrest-retainer rod 173 to move relative to torso-section support 122 of frame 112 and either engage or disengage lock receiver (e.g. rod-receiving notches N in notched strip(s) 1220S1-220S3).

In use, headrest 140 rides up and down on the upright torso-section support 122 to cause head cradle 142 of headrest 140 to move up and down relative to seat bottom 120. The caregiver can push inwardly on push handle 170 of actuator 177 to unlock head lock 152 in headrest-height controller 150 and then lift or lower headrest 140 to change the vertical position of headrest 140 relative to the upright torso-section support 122 and relative to torso section 114.

Release lever 176 includes a pivot mount 1761 comprising pivot posts 1761L, 1761R, a handle support 1762, and a rod mover 1763 coupled to headrest-retainer rod 173 as suggested in FIG. 24. Push handle 170 is arranged to move relative to head cradle 142 about horizontal pivot axis 171A and configured to be gripped by a caregiver pivoting release lever 176 about a horizontal pivot axis 171A. Return spring 177S is coupled at a first end thereof to outer plate 1801 of head cradle 142 and at an opposite second end thereof to push handle 178. Return spring 177S is configured to provide means for yieldably biasing headrest-retainer rod 173 in a direction toward back-rest support 122 of frame 112 and into a rod-receiving notch N formed in a notched strip 1220S1-S3 of the lock receiver upon arrival of headrest-retainer rod 173 in a position confronting the rod-receiving notch once a caregiver lets go of release lever 176 to allow pivoting movement of release lever 176 about pivot axis 171A so as to retain headrest 140 in a selected one of the fixed positions on torso-section support 122 of frame 112. Head cradle 142 also includes an inner plate 1802 and return spring 177S is located between inner and outer plates 1801, 1802 as suggested in FIG. 24.

As suggested in FIG. 24, cradle retainer 144 of headrest 140 includes first and second glide blocks 1911, 1912 and a web 1913 arranged to lie therebetween and formed to include a lever-receiving aperture 1914. Release lever 176 is arranged to extend through and move in lever-receiving aperture 1914 to move headrest-retainer rod 173 relative to notched strips 1220S1-S3 in lock receiver 152R. Glide blocks 1911, 1912 are arranged to extend into and through retainer-receiver aperture 144A formed in backrest 130 of torso section 114 and in channels W1, W2 formed in the upright torso-section support 122 during up-and-down movement of headrest 140 relative to the upright torso-section support 122 and relative to torso section 114.

The invention claimed is:

1. A child restraint comprising
a base adapted to set on a passenger seat in a vehicle,
a variable-height shell formed to include a child-receiving space that can be expanded and contracted in size at the option of a caregiver, the variable-height shell being mounted on the base for the movement relative to the passenger seat in the vehicle, the variable-height shell including a frame having a seat bottom and a torso-section support arranged to extend upwardly from the seat bottom and a slidable torso section mounted for up-and-down sliding movement on the torso-section support to vary the height of the slidable torso section relative to the seat bottom of the stationary frame, and
a head receiver mounted on the torso-section support, the head receiver including a movable headrest supported for up-and-down movement on the torso section support relative to the seat bottom and also for up-and-down movement relative to the torso section without moving the torso section.

2. The child restraint of claim 1, wherein the variable-height shell further includes torso-section lock means for retaining the slidable torso section in one of a lowered position on the torso-support section in close proximity to the seat bottom to provide a relatively small-sized child-receiving space so as to establish a compact mode of the variable-height shell and an elevated position on the torso-support section that is above the lowered position and away from the seat bottom to provide a relatively larger child-receiving space so as to establish an expanded mode of the variable-height shell.

3. The child restraint of claim 2, wherein the frame is mounted for angular movement on the base between a reclined position associated with a rearward-facing orientation of the variable-height shell when the base is placed on a rear passenger seat in a vehicle and an upright position associated with a forward-facing orientation of the variable-height shell when the based is placed on a rear passenger seat in the vehicle, and wherein the slidable torso section is located in the lowered position on the torso-support section of the frame to establish the compact mode of the variable-height shell when the frame is located in the reclined position on the base to cause a top edge of the slidable torso section to lie in spaced-apart relation to a forward passenger seat in the vehicle.

4. The child restraint of claim 3, wherein the head receiver further includes a headrest-mount platform mounted in a stationary position on the torso-section support of the frame to allow movement of the slidable torso section relative to the torso-section support, and a headrest-height controller arranged to interconnect the headrest-mount platform and the movable headrest and support the movable headrest for movement relative to the torso-section support of the frame and relative to the slidable torso section and wherein the slidable torso section is arranged to move up and down on the torso section support without moving the movable headrest relative to the frame.

5. The child restraint of claim 2, wherein the torso-section lock means includes a first side lock coupled to the slidable torso section to move therewith relative to the torso-support section of the frame and the first side lock is mounted for movement relative to the slidable torso section between a locked position engaging the torso-support section of the frame to retain the slidable torso section in a selected position on the frame and an unlocked position disengaging the torso-support section of the frame to free the slidable torso section to move relative to the frame between the lowered and elevated positions.

6. The child restraint of claim 5, wherein the upright torso-support section includes a center panel and a first side-lock anchor bar coupled to a first side of the center panel and arranged to extend upwardly along the first side of the center panel in a direction away from the seat bottom, the first side lock is arranged to move upwardly and downwardly along the first side-lock anchor bar during movement of the slidable torso section on the upright torso-support section of the frame between the lower and elevated positions, and the first side lock is arranged to engage the first side-lock anchor bar of the upright torso-support section to establish the locked position of the first side lock.

7. The child restraint of claim 6, wherein the upright torso-support section further includes a second side-lock anchor bar coupled to a second side of the center panel to locate the center panel between the first and second side-lock anchor bars, the second side-lock anchor bar is arranged to extend upwardly along the second side of the center panel, and the torso-section lock means includes a second lock coupled to the slidable torso section to move therewith relative to the upright torso-support section of the frame, and the second side lock is mounted for movement relative to the slidable torso section between a locked position engaging the second side-lock anchor bar to retain the slidable torso section in a selected position on the frame and an unlocked position disengaging the torso-support section of the frame to free the slidable torso section to move relative to the frame between the lowered and elevated positions when the first side lock also is in the unlocked position.

8. A child restraint comprising
a base adapted to seat on a passenger seat of a vehicle,
a variable-height shell including a frame supported on the base for movement relative to the base between a reclined position and an upright position, the frame including a seat bottom and an upright torso-section support that is arranged to extend upwardly away from a rear edge of the seat bottom, the variable-height shell further including a slidable torso section mounted for sliding movement on the upright torso-section support of the frame in a downward direction toward the seat bottom to contract in size a child-receiving space cooperatively defined by the frame and the slidable torso section and for sliding movement in an upright torso-section support of the frame in an upward direction away from the seat bottom to expand in size the child-receiving space, the upright torso-support section including a first side-lock anchor bar arranged to lie above the seat bottom and to extend upwardly in a direction away from the seat bottom, and a first side lock coupled to the slidable torso section to move up and down therewith relative to the first side-lock anchor bar during up-and-down movement of the slidable torso section on the upright torso-support section of the frame, the first side lock being configured to engage the first side-lock anchor bar to retain the slidable torso section in a selected position on the frame and to disengage the first side-lock anchor bar to free the slidable torso section to move relative to the frame, and a movable headrest coupled to the frame, wherein the slidable torso section is arranged to move up and down on the torso section support without moving the movable headrest relative to the frame.

9. The child restraint of claim 8, wherein the movable headrest is included in a head receiver including a headrest-mount platform mounted in a stationary position on the torso-section support of the frame to allow movement of the slidable torso section relative to the torso-section support, the movable headrest, and a headrest-height controller arranged to interconnect the headrest-mount platform and the movable headrest and support the movable headrest for movement relative to the torso-section support of the frame and relative to the slidable torso section.

10. A child restraint comprising
a variable-height shell formed to include a child-receiving space that can be expanded and contracted in size at the option of a caregiver, the variable-height shell includes a frame and a torso section, the frame is formed to include a seat bottom and an upright torso-section support that is arranged to extend upwardly from a rear edge of the seat bottom, the torso section is mounted for up-and-down sliding movement on the upright torso-section support of the frame, the child-receiving space is expanded in size in response to upward movement of the torso section on the upright torso-section support away from the seat bottom and contracted in size in response to downward movement of the torso section on the upright torso-section support toward the seat bottom, and a head receiver including a headrest-mount platform mounted in a stationary position on the torso-section support of the frame to allow movement of the slidable torso section relative to the torso-section support, a movable headrest, and a headrest-height controller arranged to interconnect the headrest-mount platform and the movable headrest and support the movable headrest for movement relative to the upright torso-section support of the frame and relative to the slidable torso section and wherein the slidable torso section is arranged to move up and down on the upright torso-section support without moving the movable headrest relative to the frame.

11. The child restraint of claim 10, wherein the variable-height shell further includes a torso-section lock system comprising means for releasably locking the slidable torso section to the upright torso-section support of the frame in one of several elevated positions selected by a caregiver and located above the seat bottom to establish the elevation of the slidable torso section relative to the seat bottom of the frame, the slidable torso section includes a center wing support, a first side wing coupled to one side of the center wing support, and a second side wing coupled to an opposite side of the center wing support, and the torso-section lock system includes a first side lock mounted on the first side wing of the slidable torso section for movement relative to the first side wing between a locked position engaging a first side of the upright torso-section support and an unlocked position disengaging the first side of the upright torso-section support, the torso-section lock system also includes a second side lock mounted on the second side wing of the slidable torso section for movement relative to the second side wing between a locked position engaging on opposite second side of the upright torso-section support and an unlocked position disengaging the opposite second side of the upright torso-section support, and a caregiver can operate the first and second side locks simultaneously to free the slidable torso section to move up and down on the upstanding torso-section support of the frame so as to change the elevation of the torso section relative to the seat bottom so that the child-receiving space is expanded or contracted.

12. The child restraint of claim 11, wherein the upright torso-section support of the frame includes a center panel coupled to a rear edge of the seat bottom, a first side-lock anchor bar coupled to a first side of the center panel, and a second side-lock anchor bar coupled to an opposite second side of the center panel, each side-lock anchor bar is formed to include several lock receivers, and each lock receiver is associated with one of the several elevated positions of the slidable torso section on the upright torso-section support of the frame to allow a caregiver to operate the first and second side locks to disengage the companion first and second side-lock anchor bars to free the slidable torso section for up-and-down movement on the upright torso-section support relative to the seat bottom and then to establish a selected elevated position of the torso section above the seat bottom of the frame, the caregiver aligns the first side lock with a selected lock receiver in the first side-lock anchor bar and simultaneously aligns the second side lock with a companion selected lock receiver in the second side-lock anchor bar to cause the first and second side locks to engage their respective lock receivers so that the slidable torso section is retained in a stationary elevated position selected by the caregiver on the upright torso-section support of the frame above the seat bottom of the frame.

* * * * *